(12) United States Patent
Hunnicutt

(10) Patent No.: US 9,702,481 B2
(45) Date of Patent: Jul. 11, 2017

(54) PILOT-OPERATED SPOOL VALVE

(71) Applicant: DunAn Microstaq, Inc., Austin, TX (US)

(72) Inventor: Harry A. Hunnicutt, Dexter, MI (US)

(73) Assignee: DunAn Microstaq, Inc., Austin, TX (US)

( * ) Notice: Subject to any disclaimer, the term of this patent is extended or adjusted under 35 U.S.C. 154(b) by 375 days.

(21) Appl. No.: 14/524,274

(22) Filed: Oct. 27, 2014

(65) Prior Publication Data

US 2015/0090354 A1   Apr. 2, 2015

Related U.S. Application Data

(62) Division of application No. 13/391,055, filed as application No. PCT/US2010/045156 on Aug. 11, 2010, now abandoned.

(Continued)

(51) Int. Cl.
*F16K 11/07* (2006.01)
*F16K 99/00* (2006.01)
(Continued)

(52) U.S. Cl.
CPC ...... *F16K 99/0059* (2013.01); *F15B 13/0402* (2013.01); *F15B 13/0433* (2013.01);
(Continued)

(58) Field of Classification Search
CPC ....... Y10T 137/8663; Y10T 137/86622; Y10T 137/86702; Y10T 137/86582;
(Continued)

(56) References Cited

U.S. PATENT DOCUMENTS 668,202 A    2/1901   Nethery
886,045 A    4/1908   Ehrlich et al.
(Continued)

FOREIGN PATENT DOCUMENTS

CN    200880014057      7/2010
CN    101617155 B       3/2012
(Continued)

OTHER PUBLICATIONS

Chinese Office Action dated Jun. 5, 2013, in counterpart Chinese patent application.
(Continued)

*Primary Examiner* — Craig J Price
(74) *Attorney, Agent, or Firm* — MacMillan, Sobanski & Todd, LLC

(57) ABSTRACT

A pilot-operated spool valve includes a body defining a bore. A supply port and a load port are in fluid communication with the bore. A spool is disposed in the longitudinal bore, and the spool and the body cooperate to define a command chamber at a first end of the spool, which command chamber is adapted to receive fluid at a command pressure supplied to the body. The spool is movable in the bore to control fluid communication between the supply port and the load port. A pressure space is defined in at least one of the body and the spool between the command chamber and both of the supply port and the load port in all operative positions of the spool. The pressure space is supplied with pressurized fluid such that leakage from the command chamber is minimized or eliminated.

8 Claims, 11 Drawing Sheets

Related U.S. Application Data

(60) Provisional application No. 61/234,522, filed on Aug. 17, 2009.

(51) Int. Cl.
*F15B 13/04* (2006.01)
*F15B 13/043* (2006.01)
*F16K 31/42* (2006.01)

(52) U.S. Cl.
CPC .......... *F16K 11/07* (2013.01); *F16K 31/426* (2013.01); *F16K 99/0001* (2013.01); *F16K 99/0011* (2013.01); *Y10T 137/0396* (2015.04); *Y10T 137/8663* (2015.04); *Y10T 137/8671* (2015.04); *Y10T 137/86582* (2015.04)

(58) Field of Classification Search
CPC ....... Y10T 137/86775; Y10T 137/8671; Y10T 137/0396; F16K 99/0059; F16K 99/0001; F16K 99/0011; F16K 11/07; F16K 31/426; F15B 13/0402; F15B 13/0433
USPC ............ 137/625.66, 625.68, 625.65, 625.35, 137/625.6
See application file for complete search history.

(56) References Cited

U.S. PATENT DOCUMENTS

| | | | |
|---|---|---|---|
| 1,886,205 | A | 11/1932 | Lyford |
| 1,926,031 | A | 9/1933 | Boynton |
| 2,412,205 | A | 12/1946 | Cook |
| 2,504,055 | A | 4/1950 | Thomas |
| 2,651,325 | A | 9/1953 | Lusignan |
| 2,840,107 | A | 6/1958 | Campbell |
| 2,875,779 | A | 3/1959 | Campbell |
| 3,031,747 | A | 5/1962 | Green |
| 3,540,218 | A | 11/1970 | Finn |
| 3,729,807 | A | 5/1973 | Fujiwara |
| 3,747,628 | A | 7/1973 | Holster et al. |
| 3,860,949 | A | 1/1975 | Stoeckert et al. |
| 4,005,454 | A | 1/1977 | Froloff et al. |
| 4,019,388 | A | 4/1977 | Hall, II et al. |
| 4,023,725 | A | 5/1977 | Ivett et al. |
| 4,100,236 | A | 7/1978 | Gordon et al. |
| 4,152,540 | A | 5/1979 | Duncan et al. |
| 4,181,249 | A | 1/1980 | Peterson et al. |
| 4,298,023 | A | 11/1981 | McGinnis |
| 4,327,763 | A * | 5/1982 | Budzich ............. F15B 11/0445 137/115.07 |
| 4,341,816 | A | 7/1982 | Lauterbach et al. |
| 4,354,527 | A | 10/1982 | McMillan |
| 4,372,486 | A | 2/1983 | Tomioka et al. |
| 4,434,813 | A | 3/1984 | Mon |
| 4,476,893 | A | 10/1984 | Schwelm |
| 4,543,875 | A | 10/1985 | Imhof |
| 4,548,047 | A | 10/1985 | Hayashi et al. |
| 4,581,624 | A | 4/1986 | O'Connor |
| 4,593,719 | A | 6/1986 | Leonard et al. |
| 4,628,576 | A | 12/1986 | Giachino et al. |
| 4,647,013 | A | 3/1987 | Giachino et al. |
| 4,661,835 | A | 4/1987 | Gademann et al. |
| 4,687,419 | A | 8/1987 | Suzuki et al. |
| 4,772,935 | A | 9/1988 | Lawler et al. |
| 4,821,997 | A | 4/1989 | Zdeblick |
| 4,824,073 | A | 4/1989 | Zdeblick |
| 4,826,131 | A | 5/1989 | Mikkor |
| 4,828,184 | A | 5/1989 | Gardner et al. |
| 4,852,364 | A | 8/1989 | Seener et al. |
| 4,869,282 | A | 9/1989 | Sittler et al. |
| 4,919,749 | A | 4/1990 | Mauger et al. |
| 4,938,742 | A | 7/1990 | Smits |
| 4,943,032 | A | 7/1990 | Zdeblick |
| 4,946,350 | A | 8/1990 | Suzuki et al. |
| 4,959,581 | A | 9/1990 | Dantlgraber |
| 4,964,567 | A | 10/1990 | Heffner et al. |
| 4,966,646 | A | 10/1990 | Zdeblick |
| 4,978,062 | A | 12/1990 | Lange, Sr. |
| 5,000,009 | A | 3/1991 | Clanin |
| 5,029,805 | A | 7/1991 | Albarda et al. |
| 5,037,778 | A | 8/1991 | Stark et al. |
| 5,050,838 | A | 9/1991 | Beatty et al. |
| 5,052,192 | A | 10/1991 | Drucker |
| 5,054,522 | A | 10/1991 | Kowanz et al. |
| 5,058,856 | A | 10/1991 | Gordon et al. |
| 5,061,914 | A | 10/1991 | Busch et al. |
| 5,064,165 | A | 11/1991 | Jerman |
| 5,065,978 | A | 11/1991 | Albarda et al. |
| 5,066,533 | A | 11/1991 | America et al. |
| 5,069,419 | A | 12/1991 | Jerman |
| 5,070,706 | A | 12/1991 | Waters et al. |
| 5,074,629 | A | 12/1991 | Zdeblick |
| 5,082,242 | A | 1/1992 | Bonne et al. |
| 5,096,643 | A | 3/1992 | Kowanz et al. |
| 5,116,457 | A | 5/1992 | Jerman |
| 5,131,729 | A | 7/1992 | Wetzel |
| 5,133,379 | A | 7/1992 | Jacobsen et al. |
| 5,142,781 | A | 9/1992 | Mettner et al. |
| 5,161,774 | A | 11/1992 | Engelsdorf et al. |
| 5,169,472 | A | 12/1992 | Goebel |
| 5,176,358 | A | 1/1993 | Bonne et al. |
| 5,177,579 | A | 1/1993 | Jerman |
| 5,178,190 | A | 1/1993 | Mettner |
| 5,179,499 | A | 1/1993 | MacDonald et al. |
| 5,180,623 | A | 1/1993 | Ohnstein |
| 5,197,517 | A | 3/1993 | Perera |
| 5,209,118 | A | 5/1993 | Jerman |
| 5,215,244 | A | 6/1993 | Buchholz et al. |
| 5,216,273 | A | 6/1993 | Doering et al. |
| 5,217,283 | A | 6/1993 | Watanabe |
| 5,222,521 | A | 6/1993 | Kihlberg |
| 5,238,223 | A | 8/1993 | Mettner et al. |
| 5,244,537 | A | 9/1993 | Ohnstein |
| 5,267,589 | A | 12/1993 | Watanabe |
| 5,271,431 | A | 12/1993 | Mettner et al. |
| 5,271,597 | A | 12/1993 | Jerman |
| 5,295,360 | A | 3/1994 | Olds et al. |
| 5,309,943 | A | 5/1994 | Stevenson et al. |
| 5,323,999 | A | 6/1994 | Bonne et al. |
| 5,325,880 | A | 7/1994 | Johnson et al. |
| 5,333,831 | A | 8/1994 | Barth et al. |
| 5,336,062 | A | 8/1994 | Richter |
| 5,355,712 | A | 10/1994 | Petersen et al. |
| 5,368,704 | A | 11/1994 | Madou et al. |
| 5,375,919 | A | 12/1994 | Furuhashi |
| 5,400,824 | A | 3/1995 | Gschwendtner et al. |
| 5,417,235 | A | 5/1995 | Wise et al. |
| 5,445,185 | A | 8/1995 | Watanabe et al. |
| 5,458,405 | A | 10/1995 | Watanabe |
| 5,524,819 | A | 6/1996 | Heffner et al. |
| 5,543,349 | A | 8/1996 | Kurtz et al. |
| 5,553,790 | A | 9/1996 | Findler et al. |
| 5,566,703 | A | 10/1996 | Watanabe et al. |
| 5,577,533 | A | 11/1996 | Cook, Jr. |
| 5,589,422 | A | 12/1996 | Bhat |
| 5,611,214 | A | 3/1997 | Wegeng et al. |
| 5,785,295 | A | 7/1998 | Tsai |
| 5,810,325 | A | 9/1998 | Carr |
| 5,820,262 | A | 10/1998 | Lechner |
| 5,838,351 | A | 11/1998 | Weber |
| 5,848,605 | A | 12/1998 | Bailey et al. |
| 5,856,705 | A | 1/1999 | Ting |
| 5,873,385 | A | 2/1999 | Bloom et al. |
| 5,908,098 | A | 6/1999 | Gorman et al. |
| 5,909,078 | A | 6/1999 | Wood et al. |
| 5,924,622 | A | 7/1999 | Davis et al. |
| 5,926,955 | A | 7/1999 | Kober |
| 5,941,084 | A | 8/1999 | Sumida et al. |
| 5,941,608 | A | 8/1999 | Campau et al. |
| 5,954,079 | A | 9/1999 | Barth et al. |
| 5,955,817 | A | 9/1999 | Dhuler et al. |
| 5,970,998 | A | 10/1999 | Talbot et al. |
| 5,994,816 | A | 11/1999 | Dhuler et al. |
| 6,019,437 | A | 2/2000 | Barron et al. |

(56) References Cited

U.S. PATENT DOCUMENTS

| | | |
|---|---|---|
| 6,023,121 A | 2/2000 | Dhuler et al. |
| 6,038,928 A | 3/2000 | Maluf et al. |
| 6,041,650 A | 3/2000 | Swindler et al. |
| 6,076,366 A | 6/2000 | Takano et al. |
| 6,096,149 A | 8/2000 | Hetrick et al. |
| 6,105,737 A | 8/2000 | Weigert et al. |
| 6,114,794 A | 9/2000 | Dhuler et al. |
| 6,116,863 A | 9/2000 | Ahn et al. |
| 6,123,316 A | 9/2000 | Biegelsen et al. |
| 6,124,663 A | 9/2000 | Haake et al. |
| 6,171,972 B1 | 1/2001 | Mehregany et al. |
| 6,182,742 B1 | 2/2001 | Takahashi et al. |
| 6,224,445 B1 | 5/2001 | Neukermans et al. |
| 6,255,757 B1 | 7/2001 | Dhuler et al. |
| 6,279,606 B1 | 8/2001 | Hunnicutt et al. |
| 6,283,441 B1 | 9/2001 | Tian |
| 6,318,101 B1 | 11/2001 | Pham et al. |
| 6,321,549 B1 | 11/2001 | Reason et al. |
| 6,386,507 B2 | 5/2002 | Dhuler et al. |
| 6,390,782 B1 | 5/2002 | Booth et al. |
| 6,408,876 B1 | 6/2002 | Nishimura et al. |
| 6,418,741 B1 | 7/2002 | Nungesser et al. |
| 6,494,804 B1 | 12/2002 | Hunnicutt et al. |
| 6,505,811 B1 | 1/2003 | Barron et al. |
| 6,520,197 B2 | 2/2003 | Deshmukh et al. |
| 6,523,560 B1 | 2/2003 | Williams et al. |
| 6,533,366 B1 | 3/2003 | Barron et al. |
| 6,540,203 B1 | 4/2003 | Hunnicutt |
| 6,581,640 B1 | 6/2003 | Barron |
| 6,637,722 B2 | 10/2003 | Hunnicutt |
| 6,662,581 B2 | 12/2003 | Hirota et al. |
| 6,694,998 B1 | 2/2004 | Hunnicutt |
| 6,724,718 B1 | 4/2004 | Shinohara et al. |
| 6,755,761 B2 | 6/2004 | Hunnicutt et al. |
| 6,761,420 B2 | 7/2004 | Maluf et al. |
| 6,845,962 B1 | 1/2005 | Barron et al. |
| 6,857,501 B1 | 2/2005 | Han et al. |
| 6,872,902 B2 | 3/2005 | Cohn et al. |
| 6,902,988 B2 | 6/2005 | Barge et al. |
| 6,948,514 B1 * | 9/2005 | Kramer ............... F16K 31/0689 137/15.21 |
| 6,958,255 B2 | 10/2005 | Khuri-Yakub et al. |
| 6,966,329 B2 | 11/2005 | Liberfarb |
| 7,011,378 B2 | 3/2006 | Maluf et al. |
| 7,063,100 B2 | 6/2006 | Liberfarb |
| 7,210,502 B2 | 5/2007 | Fuller et al. |
| 7,372,074 B2 | 5/2008 | Milne et al. |
| 7,449,413 B1 | 11/2008 | Achuthan et al. |
| 7,452,800 B2 | 11/2008 | Sosnowchik et al. |
| 7,528,689 B2 | 5/2009 | Lee et al. |
| 8,113,448 B2 | 2/2012 | Keating |
| 8,113,482 B2 | 2/2012 | Hunnicutt |
| 8,151,583 B2 | 4/2012 | Douglas |
| 8,156,962 B2 | 4/2012 | Luckevich |
| 8,157,184 B2 | 4/2012 | Hayashi et al. |
| 8,387,659 B2 | 3/2013 | Hunnicutt |
| 8,453,678 B2 | 6/2013 | Neff et al. |
| 8,540,207 B2 | 9/2013 | Hunnicutt et al. |
| 8,593,811 B2 | 11/2013 | Price et al. |
| 2002/0014106 A1 | 2/2002 | Srinivasan et al. |
| 2002/0029814 A1 | 3/2002 | Unger et al. |
| 2002/0096421 A1 | 7/2002 | Cohn et al. |
| 2002/0174891 A1 | 11/2002 | Maluf et al. |
| 2003/0034535 A1 | 2/2003 | Barenburg et al. |
| 2003/0061889 A1 | 4/2003 | Tadigadapa et al. |
| 2003/0098612 A1 | 5/2003 | Maluf et al. |
| 2003/0159811 A1 | 8/2003 | Nurmi |
| 2003/0206832 A1 | 11/2003 | Thiebaud et al. |
| 2004/0115905 A1 | 6/2004 | Barge et al. |
| 2004/0163717 A1 | 8/2004 | Gilleo |
| 2005/0121090 A1 | 6/2005 | Hunnicutt |
| 2005/0200001 A1 | 9/2005 | Joshi et al. |
| 2005/0205136 A1 | 9/2005 | Freeman |
| 2006/0017125 A1 | 1/2006 | Lee et al. |
| 2006/0067649 A1 | 3/2006 | Tung et al. |
| 2006/0110904 A1 | 5/2006 | Conrad |
| 2006/0218953 A1 | 10/2006 | Hirota |
| 2007/0082420 A1 | 4/2007 | Milne et al. |
| 2007/0251586 A1 | 11/2007 | Fuller et al. |
| 2007/0289941 A1 | 12/2007 | Davies |
| 2008/0028779 A1 | 2/2008 | Song |
| 2008/0042084 A1 | 2/2008 | Fuller |
| 2008/0047283 A1 | 2/2008 | Pham et al. |
| 2008/0072977 A1 | 3/2008 | George et al. |
| 2008/0229770 A1 | 9/2008 | Liu |
| 2008/0271788 A1 | 11/2008 | Matsuzaki et al. |
| 2009/0020716 A1 | 1/2009 | Hokazono et al. |
| 2009/0123300 A1 | 5/2009 | Uibel |
| 2009/0186466 A1 | 7/2009 | Brewer |
| 2010/0019177 A1 | 1/2010 | Luckevich |
| 2010/0038576 A1 | 2/2010 | Hunnicutt |
| 2010/0065946 A1 | 3/2010 | Wilson |
| 2010/0204840 A1 | 8/2010 | Sun et al. |
| 2010/0225708 A1 | 9/2010 | Peng et al. |
| 2011/0192224 A1 | 8/2011 | Vonsild et al. |
| 2011/0222576 A1 | 9/2011 | Vonsild et al. |
| 2012/0000550 A1 | 1/2012 | Hunnicutt et al. |
| 2012/0145252 A1 | 6/2012 | Hunnicutt |
| 2013/0243032 A1 | 9/2013 | Arunasalam et al. |

FOREIGN PATENT DOCUMENTS

| | | |
|---|---|---|
| DE | 2215526 | 10/1973 |
| DE | 2930779 | 2/1980 |
| DE | 3401404 | 7/1985 |
| DE | 4101575 | 7/1992 |
| DE | 4417251 | 11/1995 |
| DE | 4422942 | 1/1996 |
| EP | 250948 | 1/1988 |
| EP | 261972 | 3/1988 |
| EP | 1024285 | 8/2000 |
| GB | 2238267 | 5/1991 |
| JP | 39-990 | 2/1964 |
| JP | 04-000003 | 1/1992 |
| JP | 06-117414 | 4/1994 |
| JP | 2000-187041 | 7/2000 |
| JP | 2001184125 | 7/2001 |
| JP | 2001-281265 | 10/2001 |
| JP | 2003-049933 | 2/2003 |
| JP | 63-148062 | 7/2003 |
| JP | 2005/084211 A2 | 9/2005 |
| JP | 2006-080194 | 3/2006 |
| WO | 99/16096 A1 | 4/1999 |
| WO | 99/24783 A1 | 5/1999 |
| WO | 00/14415 A2 | 3/2000 |
| WO | 00/14415 A3 | 7/2000 |
| WO | 2005/084211 A3 | 1/2006 |
| WO | 2006/076386 A1 | 7/2006 |
| WO | 2008/076388 A1 | 6/2008 |
| WO | 2008/076388 B1 | 8/2008 |
| WO | 2008/121365 A1 | 10/2008 |
| WO | 2008/121369 A1 | 10/2008 |
| WO | 2010/019329 A2 | 2/2010 |
| WO | 2010/019329 A3 | 2/2010 |
| WO | 2010/019665 A2 | 2/2010 |
| WO | 2010/019665 A3 | 2/2010 |
| WO | 2010/065804 A2 | 6/2010 |
| WO | 2010/065804 A3 | 6/2010 |
| WO | 2011/022267 A2 | 2/2011 |
| WO | 2011/022267 A3 | 2/2011 |
| WO | 2011/094300 A2 | 8/2011 |
| WO | 2011/094300 A3 | 8/2011 |
| WO | 2011/094302 A2 | 8/2011 |
| WO | 2011/094302 A3 | 8/2011 |

OTHER PUBLICATIONS

International Search Report dated Aug. 11, 2010 for Application No. PCT/US2010/045156, AM0016.
Unpublished U.S. Appl. No. 09/309,316, incorporated by reference at Col. 4, Line 30, U.S. Pat. No. 6,520,197, which Patent has prior pub. as U.S. Patent Application Pub. No. US 2001/0055242A1, pub. Dec. 27, 2001.

(56) References Cited

OTHER PUBLICATIONS

Ayon et al., "Etching Characteristics and Profile Control in a Time Multiplexed ICP Etcher," Proc. of Solid State Sensor and Actuator Workshop Technical Digest, Hilton Head SC, (Jun. 1998) 41-44.
Bachmann, Stephan, "Electronic Expansion Valves: Fitters Notes (Part 8)", Danfoss Fitters Notes, Jul. 2008.
Bartha et al., "Low Temperature Etching of Si in High Density Plasma Using SF6/02," Microelectronic Engineering, and Actuator Workshop Technical Digest, Hilton Head SC, (Jun. 1998) 41-44.
Booth, Steve and Kaina, Rachid, Fluid Handling—Big Gains from Tiny Valve, Appliance Design (Apr. 2008), pp. 46-48.
Changenet et al., "Study on predictive functional control of an expansion valve for controlling the evaporator superheat", Proc. IMechE vol. 222 Part I, May 28, 2008, pp. 571-582.
Controls Overview for Microstaq Silicon Expansion Valve (SEV), Rev. 1, Dec. 2008 [online], [retrieved May 17, 2010]. Retrieved from the Internet <URL: http://www.microstaq.com/pdf/SEV_controls.pdf>.
Copeland, Michael V., Electronic valves promise big energy savings, Fortune, Sep. 9, 2008 [online], [retrieved Sep. 9, 2008]. Retrieved from the internet <URL: http://techland.blogs.fortune.cnn.com/2008/09/09/electronic-valves-promise-big-energy-savings>.
Gui, C. et al, "Selective Wafer Bonding by Surface Roughness Control", Journal of the Electrochemical Society, 148 (4) G225-G228 (2001).
Gui, C. et al., "Fusion bonding of rough surfaces with polishing technique for silicon micromachining", Microsystem Technologies (1997) 122-128.
Günther, Götz, "Entwicklung eines pneumatischen 3/2-Wege-Mikroventils", O + P Olhydraulik Und Pneumatik, Vereinigte Fachverlage, Mainz, DE, vol. 42, No. 6, Jun. 1, 1998, pp. 396-398, XP000831050, ISSN: 0341-2660.
Higginbotham, Stacey, Microstaq's Tiny Valves Mean Big Energy Savings [online], [retrieved Dec. 8, 2008]. Retrieved from the Internet <URL: http//earth2tech.com/2008/09/09/microstaqs-tiny-valves-mean-big-energy savings (posted Sep. 9, 2008)>.
J. Mark Noworolski, et al.,"Process for in-plane and out-of-plane single-crystal-silicon thermal microactuators", Sensors and Actuators A 55 (1996); pp. 65-69.
Jonsmann et al., "Compliant Electra-thermal Microactuators", IEEE Technical Digest, Twelfth IEEE International Conference on Micro Electro Mechanical Systems Jan. 17-21, 1999, Orlando, Florida, pp. 588-593, IEEE Catalog No. 99CH36291C.
K.R. Williams et al., "A Silicon Microvalve for the Proportional Control of Fluids", Transducers '99, Proc. 10th International Conference on Solid State Sensors and Actuators, held Jun. 7-10, 1999, Sendai, Japan, pp. 18-21.
Keefe, Bob, Texas firm says value-replacing chip can drastically cut energy use, Atlanta Metro News, Sep. 10, 2008 [online], [retrieved Sep. 10, 2008]. Retrieved from the Internet <URL: http://www.ajc.com/search/content/shared/money/stories/2008/09/microstaq10_cox-F9782.html>.
Klaassen et al., "Silicon Fusion Bonding and Deep Reactive Ion Etching; A New Technology for Microstructures," Proc., Transducers 95 Stockholm Sweden, (1995) 556-559.
Linder et al., "Deep Dry Etching Techniques as a New IC Compatible Tool for Silicon Micromachining," Proc, Transducers, vol. 91, (Jun. 1991) pp. 524-527.
Luckevich, Mark, MEMS microvlaves: the new valve world, Valve World (May 2007), pp. 79-83.
Madou, Marc, "Fundamentals of Microfabrication", Boca Raton: CRC Press, 1997, 405-406.
MEMS, Microfluidics and Microsystems Executive Review [online], Posted Apr. 16, 2009. [retrieved May 17, 2010]. Retrieved from the Internet <URL: http:www.memsinvestorjournal.com/2009/04/mems-applications-for-flow-control-.html>.
Microstaq Announces High Volume Production of MEMS-Based Silicon Expansion Valve [onlne], [retrieved Jan. 27, 2010]. Retrieved from the Internet <URL: http://www.earthtimes.org/articles/printpressstory.php?news+1138955 (posted Jan. 27, 2010)>.
Microstaq Product Descriptions, SEV, CPS-4, and PDA-3 [online], Published 2009, [retrieved May 17, 2010]. Retrieved from the Internet <URL: http://www.microstaq.com/products/index.html>.
Petersen et al. "Surfaced Micromachined Structures Fabricated with Silicon Fusion Bonding" Proc., Transducers 91, (Jun. 1992) pp. 397-399.
Press Release, Freescale and Microstaq Join Forces on Smart Superheat Control System for HVAC and Refrigeration Efficiency (posted Jan. 22, 2008) [online], [retrieved May 17, 2010]. Retrieved from the Internet <URL: http://www.microstaq.com/pressReleases/prDetail_04.html>.
Press Release, Microstaq Mastering Electronic Controls for Fluid-Control Industry (posted May 5, 2005) [online[, [retrieved May 17, 2010]. Retrieved from the Internet <URL: http://www.microstaq.com/pressReleases/prDetail_02.html>.
Press Release, Microstaq Unveils Revolutionary Silicon Expansion Valve at Demo 2008 [online], [retrieved May 17, 2010]. Retrieved from the Internet <URL: http://www.microstaq.com/pressReleases/prDetail_05.html (posted Sep. 8, 2008)>.
Press Release, Nanotechnology Partnerships, Connections Spur Innovation for Fluid Control Industries (posted Jun. 9, 2005) [online], [retrieved May 17, 2010]. Retrieved from the Internet <URL: http://www.microstaq.com/pressReleases/prDetail_03.html>.
Product Review, greentechZONE Products for the week of May 18, 2009 [online], [retrieved May 17, 2010]. Retrieved from the Internet <URL: http://www.en-genius.net/site/zones/greentechZONE/product_reviews/grnp_051809>.
SMIC Announces Successful Qualification of a MEMS Chip for Microstaq (posted Oct. 26, 2009) [online], [retrieved May 17, 2010]. Retrieved from the Internet <URL: http://www.prnewswire.com/news-releases/smic-announces-successful-qualification-of-a-mems-chip-for-microstaq-65968252.html (posted Oct. 26, 2009)>.
SMIC quals Microstaq MEMS chip for fluid control (posted Oct. 26, 2009) [online], [retrieved May 17, 2010]. Retrieved from the Internet <URL: http://www.electroiq.com/ElectroiQ/en-us/index/display/Nanotech_Article_Tools_Template.articles.small-times.nanotechmems.mems.microfluidics.2009.10.smic-quals_microstaq.html>.
Tiny Silicon Chip Developed by Microstaq Will Revolutionize Car Technology (posted May 19, 2005) [online], [retrieved May 19, 2005]. Retrieved from the Internet <URL: http://www.nsti.org/press/PRshow.html?id=160>.
Turpin, Joanna R., Soft Economy, Energy Prices Spur Interest in Technologies [online], Published Dec. 8, 2008. [retrieved May 18, 2010]. Retrieved from the Internet <URL: http://www.achrnews.com/copyright/BNP_GUID_9-5-2006_A_10000000000000483182>.
Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.
W.V. Payne and P.A.Domanski,"Potential Benefits of Smart Refrigerant Distributors",Jan. 2003, Air-Conditioning and Refrigeration Technology Institute.
Yunkin et al., "Highly Anisotropic Selective Reactive Ion Etching of Deep Trenches in Silicon," Microelectronic Engineering, Elsevier Science B.V., vol. 23, (1994) pp. 373-376.
Zhixiong Liu et al., "Micromechanism fabrication using silicon fusion bonding", Robotics and Computer Integrated Manufacturing 17 (2001) 131-137.

\* cited by examiner

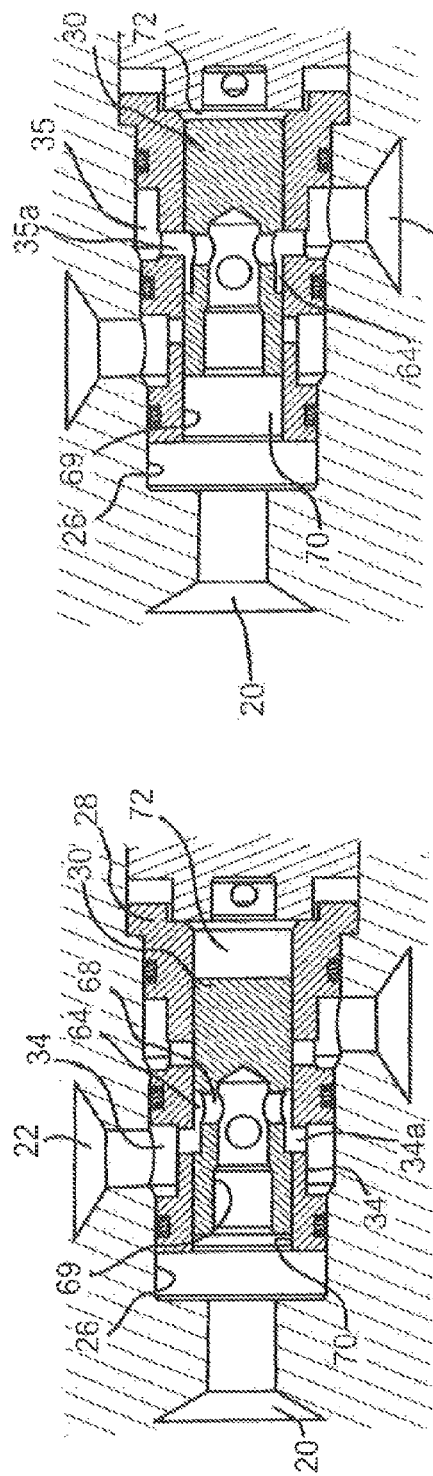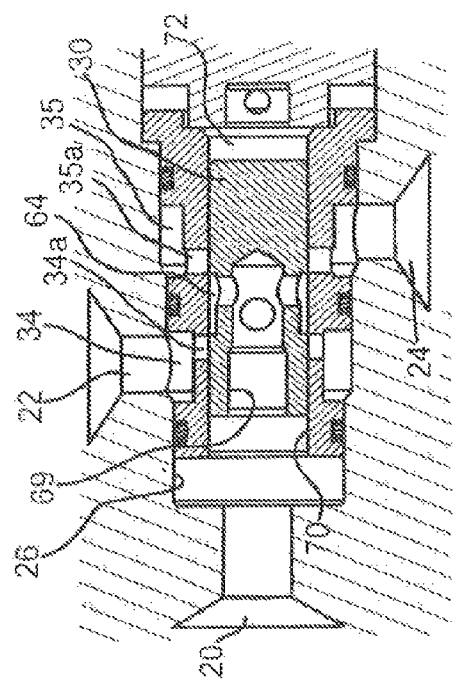

PILOT-OPERATED SPOOL VALVE

CROSS-REFERENCE TO RELATED APPLICATIONS

This application is a divisional of U.S. Ser. No. 13/391,055 filed Feb. 17, 2012, which claims the benefit of PCT application PCT/2010/045156 filed Aug. 11, 2010, which claims priority to U.S. Provisional Patent Application No. 61/234,522, filed Aug. 17, 2009, the disclosures of each of which are incorporated herein by reference

BACKGROUND

This disclosure relates to valves and to semiconductor electromechanical devices, and to control valves such as pressure control valves that are positioned by a microvalve device (i.e., a micromachined pilot valve).

MEMS (micro electro mechanical systems) are a class of systems that are physically small, having some features or clearances with sizes in the micrometer range or smaller (i.e., smaller than about 10 microns). These systems have both electrical and mechanical components. The term "micro machining" is commonly understood to mean the production of three-dimensional structures and moving parts of MEMS devices. MEMS originally used modified integrated circuit (e.g., computer chip) fabrication techniques (such as chemical etching) and materials (such as silicon semiconductor material) to micro machine these very small mechanical devices. Today there are many more micro machining techniques and materials available. The term "MEMS device" as may be used in this application means a device that includes a micromachined component having some features or clearances with sizes in the micrometer range, or smaller (i.e., smaller than about 10 microns). It should be noted that if components other than the micromachined component are included in the MEMS device, these other components may be micromachined components or standard sized (i.e., larger) components. Similarly, the term "microvalve" as may be used in this application means a valve having features or clearances with sizes in the micrometer range, or smaller (i.e., smaller than about 10 microns) and thus by definition is at least partially formed by micro machining. The term "microvalve device" as may be used herein means a device that includes a microvalve, and that may include other components. It should be noted that if components other than a microvalve are included in the microvalve device, these other components may be micromachined components or standard sized (i.e., larger) components.

Various aspects of this invention will become apparent to those skilled in the art from the following detailed description of the preferred embodiment, when read in light of the accompanying drawings.

BRIEF DESCRIPTION OF THE DRAWINGS

FIG. 3 is a sectional view of the pressure control valve in a fast apply position.

FIG. 4 is a sectional view of the pressure control valve in a fast dump position.

FIG. 5 is a sectional view of the pressure control valve modulating near an equilibrium position.

DETAILED DESCRIPTION OF THE PREFERRED EMBODIMENT

Figure 1:
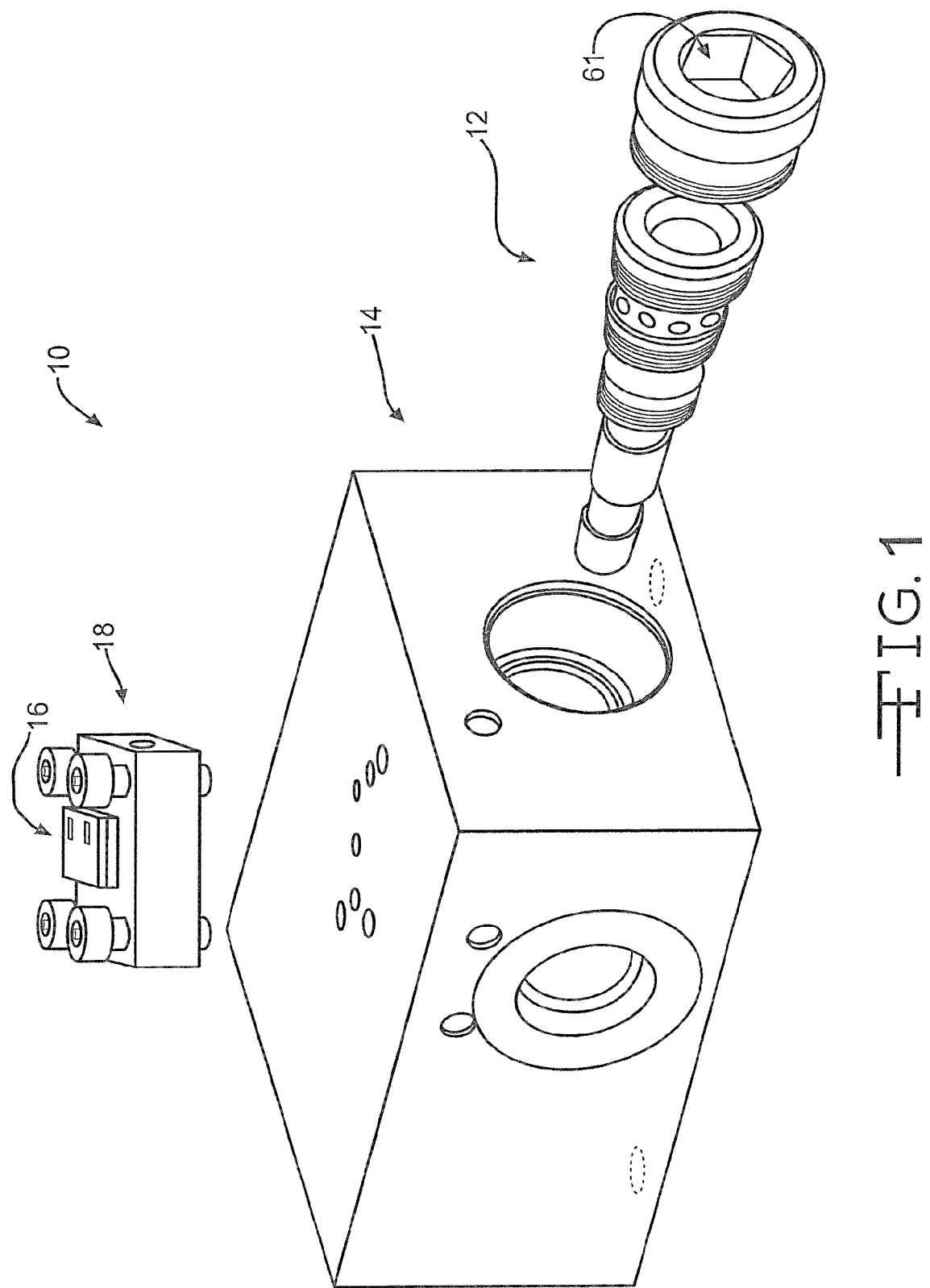
FIG. 1 is a partially exploded perspective view of a pressure control valve embodied as a microvalve device.

Referring now to the drawings, there is illustrated in FIG. 1 a microvalve device in the form of a pressure control valve is generally indicated at 10. The pressure control valve 10 may include a pilot-operated main valve 12 having a main valve body 14. The pressure control valve 10 may further include a pilot microvalve 16 for controlling the pilot-operated main valve 12, and a manifold 18 for mounting the pilot microvalve 16 in relation to the main valve body 14.

Figure 2:
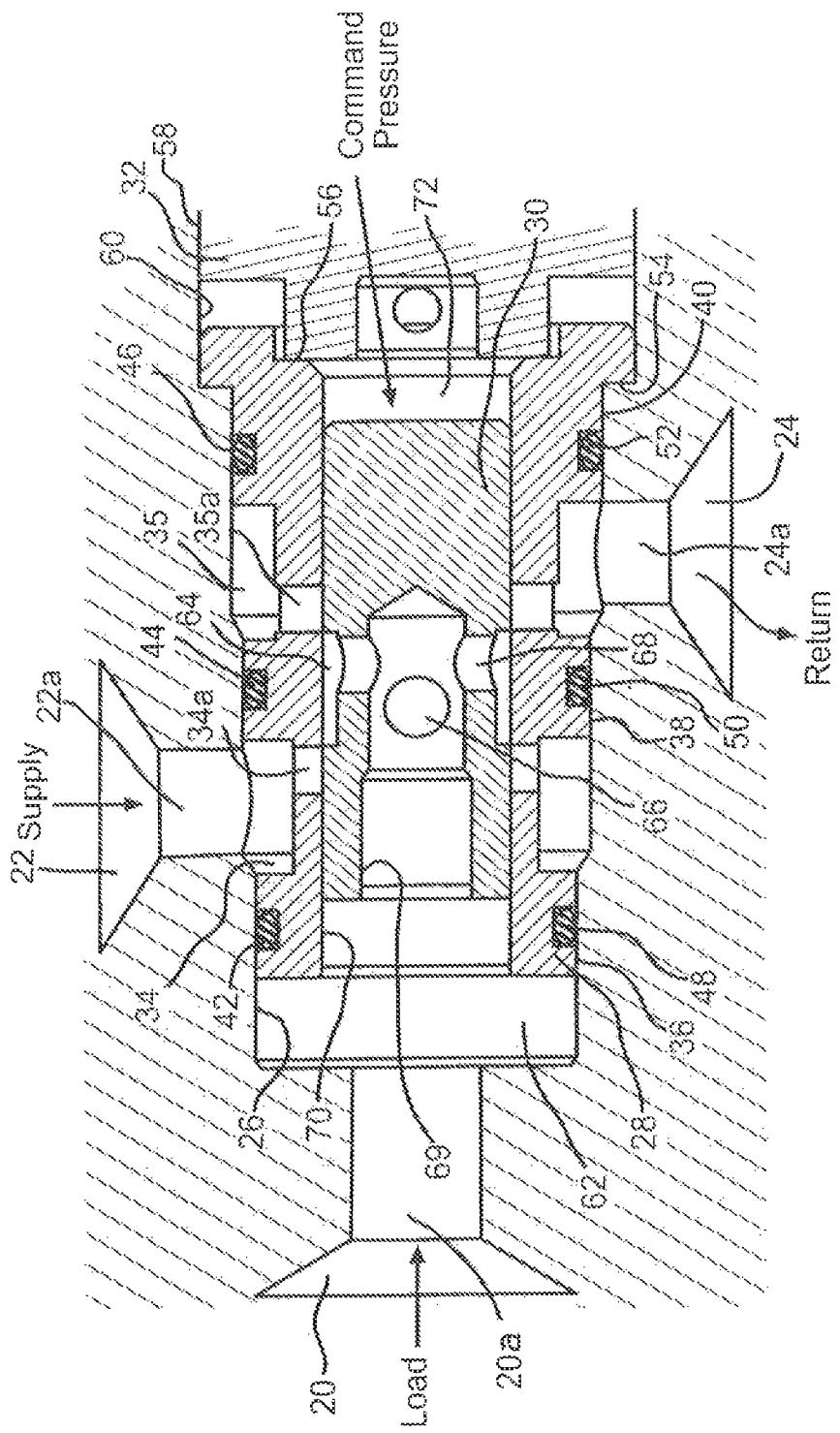
FIG. 2 is a sectional view of the pressure control valve.

As illustrated in FIG. 2, the main valve body 14 may have plural ports, including a load port 20, a supply port 22, and a return port 24, all in fluid communication with a longitudinal bore 26 in the main valve body 14. More specifically, the supply port 22 may be in fluid communication with the longitudinal bore 26 via a supply passageway 22a. Similarly, the return port 24 may be in fluid communication with the longitudinal bore 26 via a return passageway 24a. Further, the load port 20 may be in fluid communication with the longitudinal bore 26 via a load passageway 20a. Note that, in some embodiments, the longitudinal bore 26 may communicate directly with the load port 20, in which case the longitudinal bore 26 should be considered to form part of the load passageway 20a.

As best seen in FIG. 2, the longitudinal bore 26 may be a stepped bore, with cylindrical portions of increasingly larger diameter from the left end to the right end of the longitudinal bore 26 (as viewed in FIG. 2) The main valve 12 may be supported within the longitudinal bore 26. The main valve 12 may include a sleeve 28, a spool 30 supported for movement in relation to the sleeve 28, and a plug 32 supporting the sleeve 28 in the longitudinal bore 26 in fixed relation to the main valve body 14.

The sleeve 28 may have an annular groove 34 that may be in fluid communication with the supply port 20 and an annular groove 35 that may be in fluid communication with the return port 22. The annular grooves 34, 35 may be separated by lands 36, 38, 40 formed about the sleeve 28; that is, the lands 36 and 38 may define walls of the annular groove 34, and the lands 38 and 40 may define walls of the annular groove 35. Preferably the land 38 has a greater diameter than the land 36, and the land 40 has a greater diameter than the land 38, so that each land closely matches the diameter of the radially adjacent cylindrical portion of the longitudinal bore 26. One advantage of this arrangement is that the sleeve 28 cannot be assembled into the longitudinal bore except in one orientation, since the largest diameter portion of the sleeve 28 will fit into the largest diameter portion of the longitudinal bore 26, and cannot be advanced further leftward as viewed in FIG. 2 to fully dispose the sleeve 28 in the longitudinal bore 26 if the sleeve 28 is reversed in orientation from that shown in FIG. 2.

Each land 36, 38, 40 may preferably be provided with an annular groove 42, 44, 46 that supports a respective seal or O-ring 48, 50, 52. Although O-rings with a circular cross-section are illustrated, any suitable type of seal, with any suitable cross-section, made of any suitable material may be used. The O-rings 48, 50, 52 may provide a pressure seal between the sleeve 28 and the surface of the main valve body 14 defining the longitudinal bore 26. The O-rings 48, 50, 52 thus may form a pressure boundary between the fluid in the annular groove 34 and the fluid in the annular groove 35. The sleeve 28 may have an annular shoulder 54 at one end that engages an annular shoulder 56 at a corresponding end of the longitudinal bore 26 to position the sleeve 28 in relation to the longitudinal bore 26 and in relation to the main valve body 14. A bore 70 may be formed longitudinally through the sleeve 28 along a central axis thereof. One or more radial bores 34a (seen in FIG. 2) may be formed through the sleeve 28 to provide fluid communication between the groove 34 and the inner surface of the sleeve 28 defining the bore 70. Similarly, one or more radial bores 35a (seen in FIG. 2) may be formed through the sleeve 28 to provide fluid communication between the groove 35 and the inner surface of the sleeve 28 defining the bore 70.

The sleeve 28 may be held in a fixed position against the shoulder 56, and thus be in fixed relation to the main valve body 14 by the plug 32. The plug 32 may have a male threaded portion 58 that threadably engages a female threaded portion 60 of the longitudinal bore 26. While any suitable arrangement may be provided, the plug 32 may be in the form of a plug that includes an hex socket 61 (shown in FIG. 1) that receives an hex key (wrench) for tightening the male threaded portion 58 of the plug 32 in relation to the female threaded portion 60 of the longitudinal bore 26.

The plug 32 may be sized and configured to engage the sleeve 28 and hold the annular shoulder 54 of the sleeve 28 into engagement with the annular shoulder 56 of the longitudinal bore 26. A clearance 62 may be provided between the end of the sleeve 28 opposite the shoulder end of the sleeve 28 and the end of the longitudinal bore 26 opposite the shoulder end of the longitudinal bore 26. The clearance 62 may be sufficient to ensure that the annular shoulder 54 of the sleeve 28 is held into engagement with the annular shoulder 56 of the longitudinal bore 26.

The exterior surface of the spool 30 may define an annular groove 64. The annular groove 64 may be in fluid communication with a plurality of radial passages 66, 68 in the spool 30, which in turn may be in fluid communication with a longitudinal bore 69 in the spool 30. The longitudinal bore 69 of the spool 30 may extend leftward (as viewed in FIG. 2) to an opening in the left (as viewed in FIG. 2) axial end face of the spool 30, which opening may provided fluid communication between the longitudinal bore 69 of the spool and the longitudinal bore 70 of the sleeve 28. The leftward portion (as viewed in FIG. 2) of the longitudinal bore 70 of the sleeve 28, in turn, may provide fluid communication with the load port 20. In this manner, the groove 64 may be constantly in fluid communication with the load port 20.

The spool 30 may be supported for longitudinal movement in the longitudinal bore 70 in the sleeve 28. The spool 30 may be moved to a first position such that the annular groove 64 in the spool 30 is in fluid communication with the supply port 22 via the one or more radial bores 34a and the annular groove 34 in the sleeve 28, or the spool 30 may be moved to a second position such that the annular groove 64 in the spool 30 is in fluid communication with the return port 24 via the one or more radial bores 35a and the annular groove 35 formed in the sleeve 28. In this way, the spool 30 may be movable to control fluid flow between the supply port 22 and the load port 20, as shown in FIG. 3, or the load port 20 and the return port 24, as shown in FIG. 4.

Although not shown, one or more springs may be provided to urge the spool 30 toward a normal position in which the spool 30 is disposed in the absence of any other significant forces acting on the spool 30. It should be recognized that in most instances, such a spring would typically be chosen such that the force exerted by such a spring would be relatively minor compared to the forces exerted by the fluid pressures acting on the spool 30 during operation (and in any event, the effect of a spring preload in the balance of forces acting on a spool valve may be easily comprehended by those of ordinary skill in the art of design of such spool valves). Therefore, for the sake of simplicity, a description of the minor effects of the spring on the operation of the main valve 12 will be omitted from the description of operation of the pressure control valve 10.

The main valve 12 may modulate near a third position, which is an equilibrium position, as shown in FIG. 5. In the equilibrium position, the annular groove 36 in the spool 30 may be prevented from communicating with the annular groove 34 in communication with the supply port 22, and may be also prevented from communicating with the annular groove 35 in communication with the return port 24, thus holding pressure constant at the load port 20. With such and arrangement, the main valve 12 might be termed a "closed center" valve. However, it is also contemplated that the main valve 12 might be designed to be an "open center" valve, where, in an equilibrium position (not shown), the annular groove 36 in the spool 30 would communicate with both the annular groove 34 in communication with the supply port 22 and with the annular groove 35 in communication with the return port 24 so that the fluid flow into the main valve 12 from the supply port 22 would exactly equal the fluid flow out of the main valve 12 from the return port 24. With the flows in and out thus balanced, there would be no flow into or out of the load port 20, and pressure would hold constant at the load port 20. However, the rest of this description will describe the structure and operation of the valve in the context of a closed center valve, as illustrated in FIG. 5.

A command chamber 72 may be provided at the right end (as viewed in FIGS. 2 through 5) of the longitudinal bore 70, opposite the load port 20. A command pressure introduced into the command chamber 72 may control the movement of the spool 30. Applying a command pressure above the load pressure in the load port 20 may move the spool 30 away from the command chamber 72 (i.e., to the left when viewing FIG. 3). Such movement of the spool 20 away from the command chamber 72 may bring the annular groove 64 in the spool 30 into fluid communication with the annular groove 34 in the sleeve 28 via the radial bores 34a, and via the annular groove 34 be in fluid communication with the supply port 30 to permit fluid flow between the supply port 22 and the load port 20 via the bores 69, 70, and 26, as shown in FIG. 3.

If the pressure in the command chamber 72 is below the load pressure, the spool 30 may move so that the annular groove 64 in the spool 30 is in fluid communication with the annular groove 35 in the sleeve 28 via the radial bores 35a. The annular groove 35, as indicated above, may be in fluid communication with the return port 22, thus permitting fluid flow between the load port 20 and the return port 24, as shown in FIG. 4. This may act to lower load pressure to command pressure. When the load pressure is equal to the pressure in the command chamber 72, the spool 30 will have been moved so that the annular groove 64 in the spool 30 is in fluid communication with neither the annular groove 34 nor the annular groove 35, thus isolating the load port 20 from both the supply port 22 and the return port 24, as shown in FIG. 5.

The command pressure in the command chamber 72 may be controlled by the pilot microvalve 16, which may be in fluid communication with the command chamber 72 via the manifold 18, and which may be selectively in fluid communication with the supply port 22 and the return port 24 via the manifold 18 to control the command pressure.

The pilot microvalve 16 may include a movable valve element that, in movement, simultaneously varies the effective cross-sectional area of two orifices arranged in series in a flow path through the pilot microvalve 16. An example of one microvalve that has such characteristics is the model PDA-3 proportional direct acting 3-way microvalve developed by Microstaq, Inc., of Austin, Tex.

Figure 6:
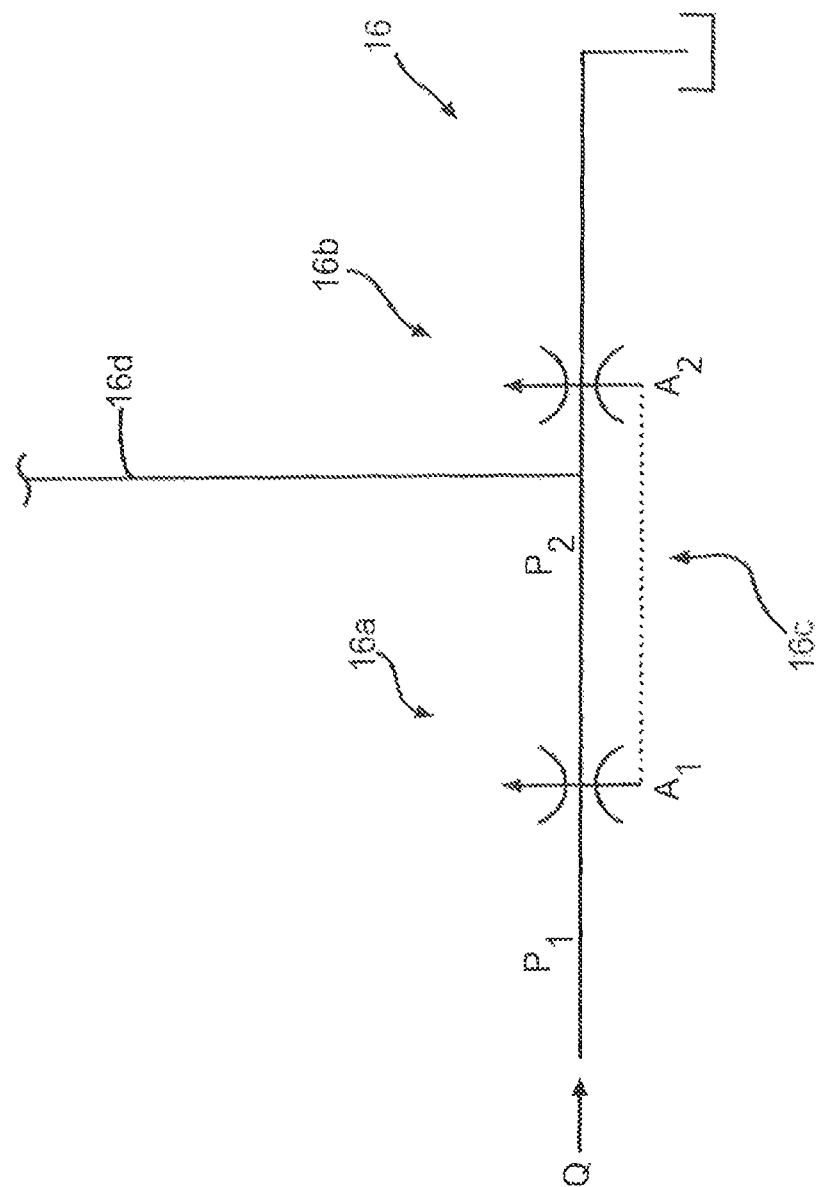
FIG. 6 is a diagrammatic representational view of a pilot microvalve with two variable orifices in series.

The operation of the two orifices in series may be understood with reference to FIG. 6, wherein, in accordance with standard symbology, an arrow through the symbol of a component is used to indicate a variable component, in this case, a variable orifice. The pilot microvalve 16 may be illustrated as comprising a first orifice 16a and a second orifice 16b that is in the same fluid path as the first orifice 16a. Thus the first orifice 16a and the second orifice 16b are disposed in series arrangement in a fluid conduit 16c. A dashed line indicates that the orifices 16a, 16b are operated together in a predetermined relationship. A relationship between the flow of a fluid of a given density through fluid conduit 16c of the pilot microvalve 16, the cross-sectional areas of the orifices 16a, 16b, the pressure supplied to the pilot microvalve 16, and the pressure of the fluid in the fluid conduit 16c between the orifices 16a, 16b can be derived mathematically, as follows:

$$Q = C_d A_1 \sqrt{\frac{2(P_1 - P_2)}{\rho}} \quad \text{Equation 1}$$

$$Q = C_d A_2 \sqrt{\frac{2P_2}{\rho}} \quad \text{Equation 2}$$

$$A_1 \sqrt{\frac{2(P_1 - P_2)}{\rho}} = A_2 \sqrt{\frac{2P_2}{\rho}} \quad \text{Equation 3}$$

$$\boxed{P_2 = \frac{P_1 \cdot A_1^2}{A_1^2 + A_2^2}} \quad \text{Equation 4}$$

where Q is the volumetric flow rate, $C_d$ is the discharge coefficient, which marginally reduces the flow rate Q to account for the effects of viscosity and turbulence converting kinetic flow energy into heat, $A_1$ is the area of the first orifice 16a, $A_2$ is the area of the second orifice 16b, $P_1$ is the supply pressure supplied to whichever of the first orifice 16a and the second orifice 16b is the upstream orifice in the fluid conduit 16c containing the first orifice 16a and the second orifice 16b, $P_2$ is the pressure of the fluid in the fluid conduit 16c that defines the fluid flow path between the first orifice 16a and the second orifice 16b, and $\rho$ is the density of the fluid. The pressure $P_2$ of the fluid is utilized as the command pressure supplied from the pilot microvalve 16 to the main valve 12 via a second fluid conduit 16d. The second fluid conduit may be defined by portions of several components, including the pilot microvalve 16, the manifold 18, and the main valve body 14.

Equation 1 is derived from the Incompressible Bernoulli's Equation, utilizing the Continuity Equation to relate the speed of a fluid moving through a fluid conduit to the cross sectional area of the fluid conduit, and calculates the volumetric flow rate going through the first orifice 16a. Equation 2 is the same equation as Equation 1, applied to the second orifice 16b, and assumes that the pressure downstream of the second orifice is negligible (since systems incorporating pressure control valves are typically designed such that the pressure of the return line is essentially zero). Equation 3 substitutes Equation 1 into Equation 2. Equation 4 rearranges Equation 3 to solve for $P_2$.

In a non-actuated state of the microvalve, one of the two variable orifices 16a, 16b may be just closed (i.e., normally closed) and the other variable orifice 16a, 16b may be fully open. Upon actuation of the pilot microvalve 16, the closed orifice begins to open and the open orifice begins to close. Supply pressure can be applied to the normally closed orifice or to the normally open orifice. For example, if the supply pressure is applied to the normally closed orifice, the pressure between the orifices will begin to rise and will vary as the pilot microvalve 16 begins to open. The result is that a pressure may be created between the orifices, wherein the pressure is a fraction (potentially, depending upon the specifics of the design of the microvalve, from substantially 100% to substantially 0%) of the supply pressure.

The relationships described in Equations 1-4 may be used to design the pilot microvalve 16 and the electronic circuits controlling the pilot microvalve 16. As will be further discussed below, in the illustrated embodiment of the microvalve device 10, the load pressure of the main valve 12 will (in steady state flow conditions) equal the command pressure $P_2$ controlled by the microvalve device 10. During transient flow conditions, of course, load pressure may lag command pressure.

It should be noted that a difference between the method of control offered by this design and a more conventional pressure control valve is that this device enables controlling load pressure to some commanded fraction of the supply pressure $P_1$. In contrast, in a more conventional pressure control valve, the pressure is controlled in a range up to a maximum set pressure regardless of the supply pressure, as long as the supply pressure equals or exceeds the set pressure. For example, a typical automotive transmission control valve may control pressure in a range of 0 p.s.i. to 100 p.s.i., as long as the supply pressure is at or above 100 p.s.i. If the supply pressure is raised to 125 p.s.i., this typical automotive control valve will still be limited to supplying a maximum of 100 p.s.i. In contrast, an automotive transmission control valve embodied as the microvalve device 10 would be able to control pressure substantially in a range of 0% to 100% of the supply pressure $P_1$, or any commanded fraction of supply pressure $P_1$, and thus could be caused to expand the range of pressure control above 100 p.s.i. simply by increasing supply pressure $P_1$ to a value above 100 p.s.i.

Additionally, it will be appreciated that the arrangement above allows the pilot microvalve 16 and the associated control circuitry to be easily adapted for use with a variety of different main valves 12, which main valves 12 are supplied with different supply pressures $P_1$ in a variety of installations. When the main valve 12 and the pilot microvalve 16 are supplied with the same supply pressure $P_1$, a control signal to the pilot microvalve 16 to generate maximum command pressure (by closing the second, downstream, variable orifice 16b, and fully opening the first variable orifice 16a), a command pressure $P_2$ equal to supply pressure $P_1$ may be generated. When the command pressure $P_2$ equal to supply pressure $P_1$ is supplied to the main valve 12, the main valve 12 may operate to generate a load pressure equal to command pressure, and thus equal to supply pressure $P_1$. Thus, regardless of supply pressure in the particular application, a control scheme in which the valve control electronics elements (not shown) control the pilot microvalve 16 to control the connected main valve 12 to deliver a desired percentage of the supply pressure (from zero to 100%), need not be customized to any great extent (if at all) when manufacturing the pressure control valve 10 for different applications. This may, for example, allow a valve manufacturer to reduce the number of different models of pilot microvalves that must be designed and manufactured, since one or a few pilot microvalves could be used with a variety of sizes of main valves 12, in a variety of applications without re-designing the valve control elements.

It is also noted that, in the case where supply pressure $P_1$ is closely regulated, and remains substantially constant, percentages of supply pressure $P_1$ can be correlated to actual pressure values. In such instances, control schema can be developed where, for example, if it is desired to raise load pressure 5 p.s.i., the control algorithm implemented in the valve control elements can just change a control signal to the pilot microvalve 16 by an percentage amount known to cause a 5 p.s.i. pressure increase in command (and thus load) pressure, given the known value of supply pressure $P_1$.

The command chamber 72 in the main valve 12 may be connected via a in fluid communication with the fluid conduit 16 between the first orifice 16a and the second orifice 16b. The pilot microvalve 16 may be made entirely of silicon or other suitable material, and may be provided with an actuation mechanism that may rely on heating of certain elements to cause thermal expansion of these elements, to produce movement, or may rely upon any other actuation mechanism that may be suitable for a desired application, such as actuators depending upon such diverse principles as material phase change, electrostatic attraction or repulsion, magnetism, etc. It is noted that a thermally actuated silicon microvalve such as the Microstaq, Inc. PDA-3 microvalve would not present an inductive load to the electronic system used to power and control the pilot microvalve 16, unlike, for example, a solenoid-operated valve. Furthermore, an advantage of fabricating a MEMS device, like the pilot microvalve 16, of a semiconductor material such a silicon is the ease of integrating control elements. For example, the valve controller circuitry may be fabricated on the same semiconductor chip that the MEMS pilot microvalve 16 is formed in, using similar semiconductor fabrication techniques. This, in turn, permits reductions in fabrication costs in the case of mass production, and increased reliability of the microvalve 16, since the interconnection of the microvalve 16 and the associated electronic control elements may be performed automatically as part of the fabrication process, without the need for humans to individually route and solder connection wiring (for example).

The pilot microvalve 16 may be used to send the command pressure to the main valve 12 by any well known conventional means. In the illustrated embodiment, the manifold 18 may be utilized to connect the closely spaced ports of the pilot microvalve 16 to corresponding ports on the main valve 12, which may be more widely separated for ease of manufacturing of the relatively much larger main valve 12. The pilot microvalve 16 may be fixed to the manifold 18 in any suitable manner, including those described in U.S. Published Patent Application No. US 2007/0251586 A1, entitled "Electro-Pneumatic Control Valve with Microvalve Pilot", the disclosure of which is hereby incorporated herein by reference, which describes soldering a microvalve to a manifold, and in U.S. Pat. No. 6,581,640 entitled "Laminated Manifold for Microvalve", the disclosure of which is hereby incorporated herein by reference, describes a terminal block that is fixed to a manifold for a microvalve by any suitable means, such as a mechanical fastener (such as a rivet or a bolt, for example), by a suitable adhesive, or by soldering.

The manifold 18 may be fixed to the main valve 12 in any suitable manner For example, a gasket may form a seal between the main valve body 14 and the microvalve manifold 18, and the manifold 18 retained to the main valve body 14 through the use of bolts or other mechanical fasteners, or by welding, brazing, soldering, use of adhesives, etc.

Although the use of a separate manifold such as the manifold 18 (or, indeed, the manifolds 118 or 218 described below) may frequently be found to advantageous during the manufacture of a microvalve device such as the pressure control valve 10, such is not required, that is that the manifold 18 may be formed integrally with the pilot microvalve 16 or with the main valve body 14. For example, the main valve body 14 (i.e., closely spaced ports can be formed in the main valve body 14 that mate with the ports on the pilot microvalve 16), and the pilot microvalve 16 may be mounted directly on the valve body 14 using the techniques referenced above for attaching the pilot microvalve 16 to the manifold 18, or, as appropriate, for attaching the manifold 19 to the main valve body 14.

The manifold 18 may have a port 18a that communicates the command pressure from the fluid conduit 16c to a port on the main valve 12 that communicates with the command chamber 72. The port 18a (or other part of the entirety of the fluid conduit between the pilot microvalve 16 to the command chamber 72, which may include an orifice (not shown) disposed in such fluid conduit) may be sized to provide appropriate damping to the motion of the main valve spool 30.

Figure 11:
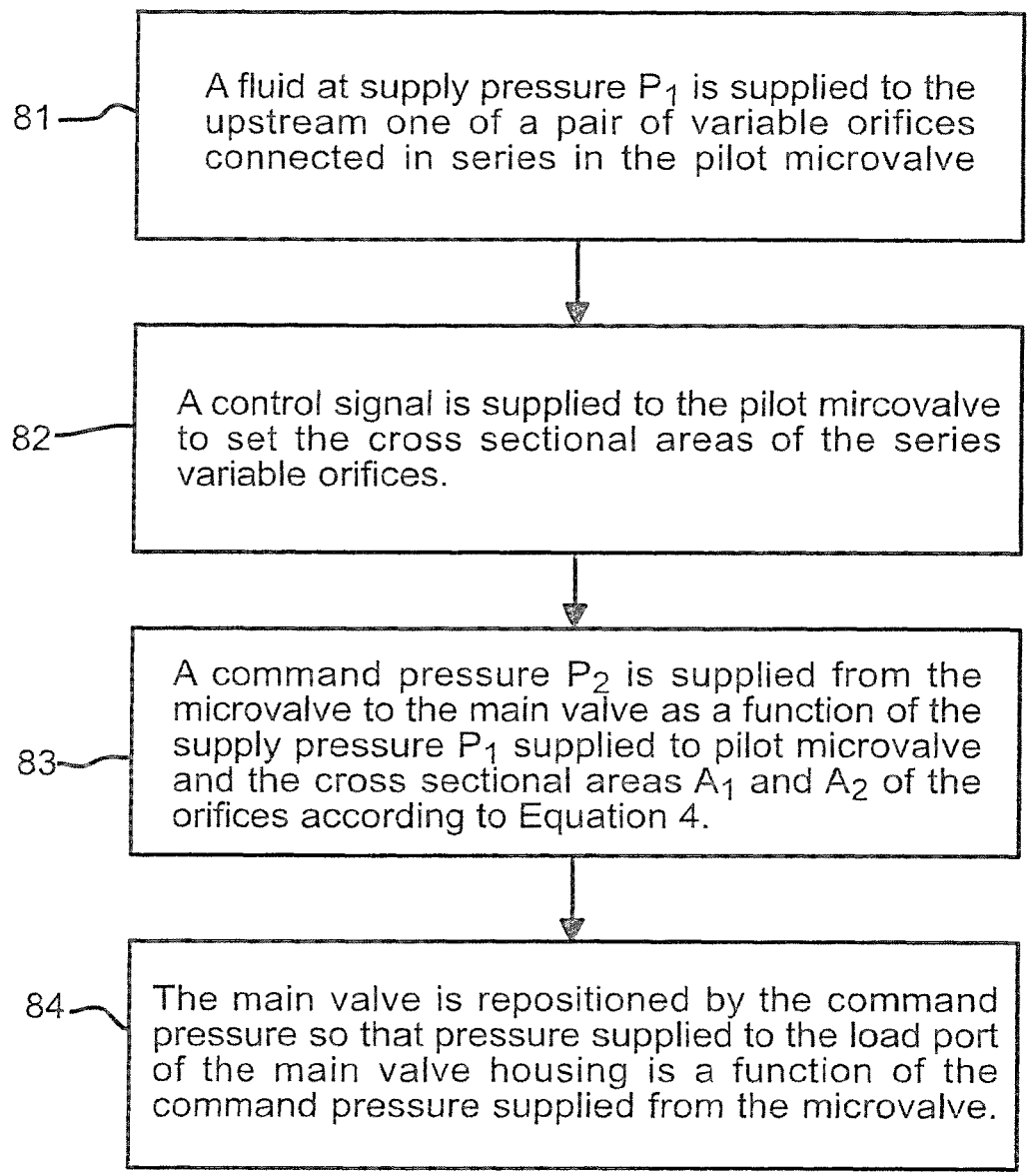
FIG. 11 is a method of operation of the pressure control valve.

The microvalve device in the form of the pressure control valve 10 may operate as discussed below, and as shown in FIG. 11.

In a first step 81, a fluid is supplied at a supply pressure $P_1$ to the pilot microvalve 16, and, more specifically, to the upstream one of the series variable orifices 16a and 16b of the pilot microvalve 16.

In a second step 82, a control signal (which may be, depending upon the particular design of the pilot microvalve 16, an electrical signal, a pneumatic signal, a fluid pressure signal, a sensible heat signal (if for example, the pilot microvalve were to respond to a temperature applied to it), or any other suitable signal for which a microvalve may be designed to react) may be supplied to the pilot microvalve 16 to set the cross sectional areas $A_1$ and $A_2$ of the series variable orifices 16a and 16b, respectively.

In a third step 83, the command pressure $P_2$ may be supplied from the microvalve 16 to the command chamber 72 of the main valve 12 as a function of pressure $P_1$ supplied to pilot microvalve 16, and the cross sectional areas $A_1$ and $A_2$ of the orifices 16a and 16b, respectively, according to Equation 4 above. Suitably, the pressure in the command chamber 72 may be somewhat damped (not allowed to rise or fall as fast as the command pressure $P_2$ supplied by the pilot microvalve 16) if a suitable restriction is provided in the port 18a (or elsewhere in the fluid conduit between the pilot microvalve 16 and the command chamber 72). This may be useful, for example, to dampen any "noise" (rapid uncommanded oscillations) that may be present in the command pressure, and thus dampen the resultant motion (discussed below) in the main valve 12, and thus the pressure output of the main valve 12.

Next, in a fourth step 84, the main valve 12 may be repositioned by the command pressure $P_2$ in the command chamber 72, so that pressure supplied to the load port 20 of the main valve body 14 is a function of the command pressure $P_2$ supplied from the microvalve 16. Applying a command pressure $P_2$ above the load pressure may move the spool 30 so that the load port 20 is in fluid communication the supply port 30 (via the annular groove 64 in the spool 30 and the annular groove 34 in the sleeve 28) to increase the load pressure, as shown in FIG. 3. If the pressure in the command chamber 72 is below the load pressure, the spool 30 may be moved so that the load port 20 is in fluid communication with the return port 24 (via the annular groove 64 in the spool 30 and the annular groove 35 in the sleeve 28), to lower the load pressure, as shown in FIG. 4. When the load pressure is equal to the command pressure $P_2$ in the command chamber 72, the spool 30 may be moved to a modulating position where the load port 20 is not in fluid communication with either the supply port 22 or the return port 24, as shown in FIG. 5. In this way, the pressure supplied by the main valve 12 to the load follows command pressure $P_2$ supplied by the pilot microvalve 16, and the microvalve device that is the pressure regulating valve 10 may be responsive to the command signal supplied to the pilot microvalve 16.

Figure 7:
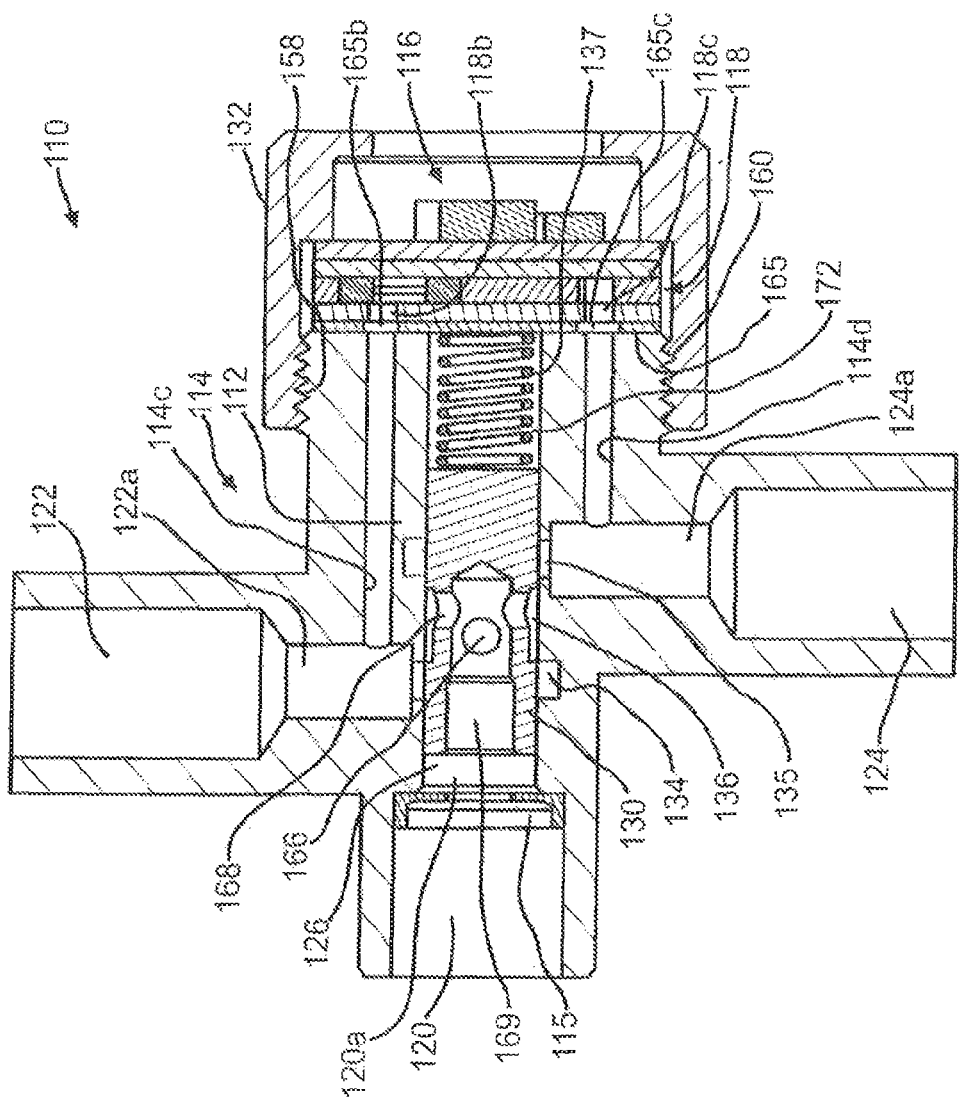
FIG. 7 is a sectional view of an alternate embodiment of a pressure control valve embodied as a microvalve device.
Figure 8:
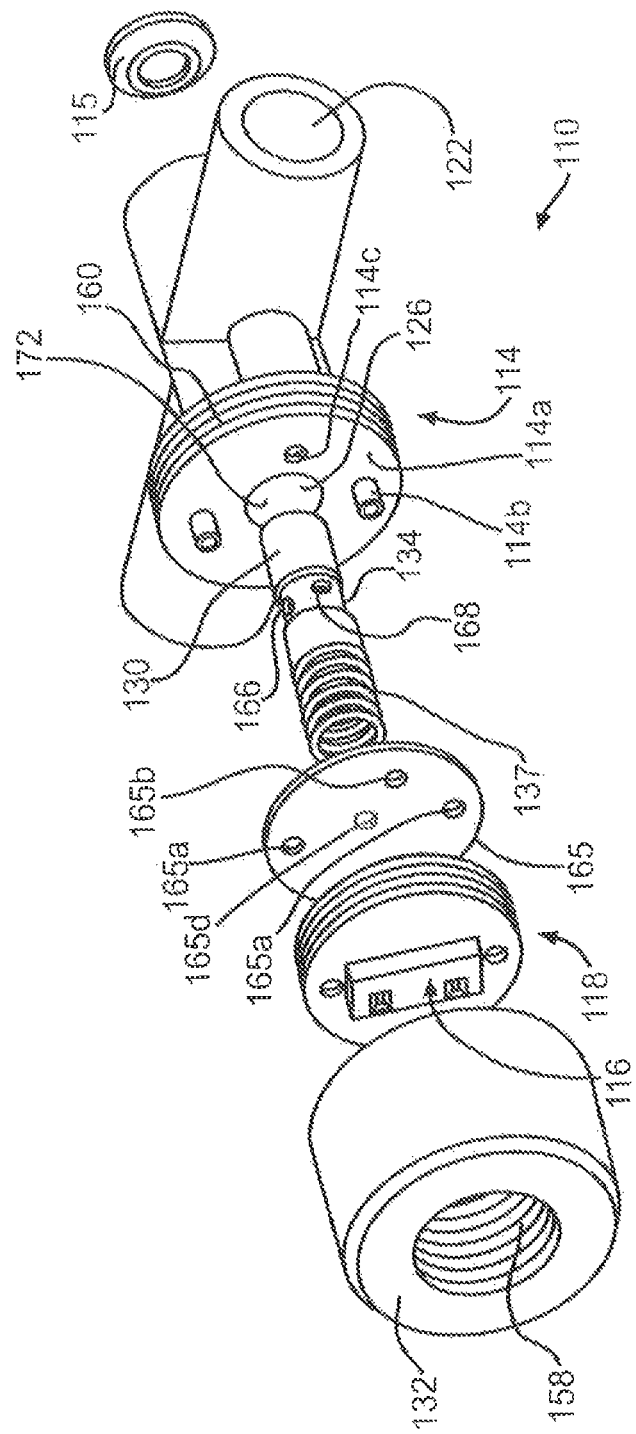
FIG. 8 is an exploded perspective view of the pressure control valve shown in FIG. 6.
Figure 9:
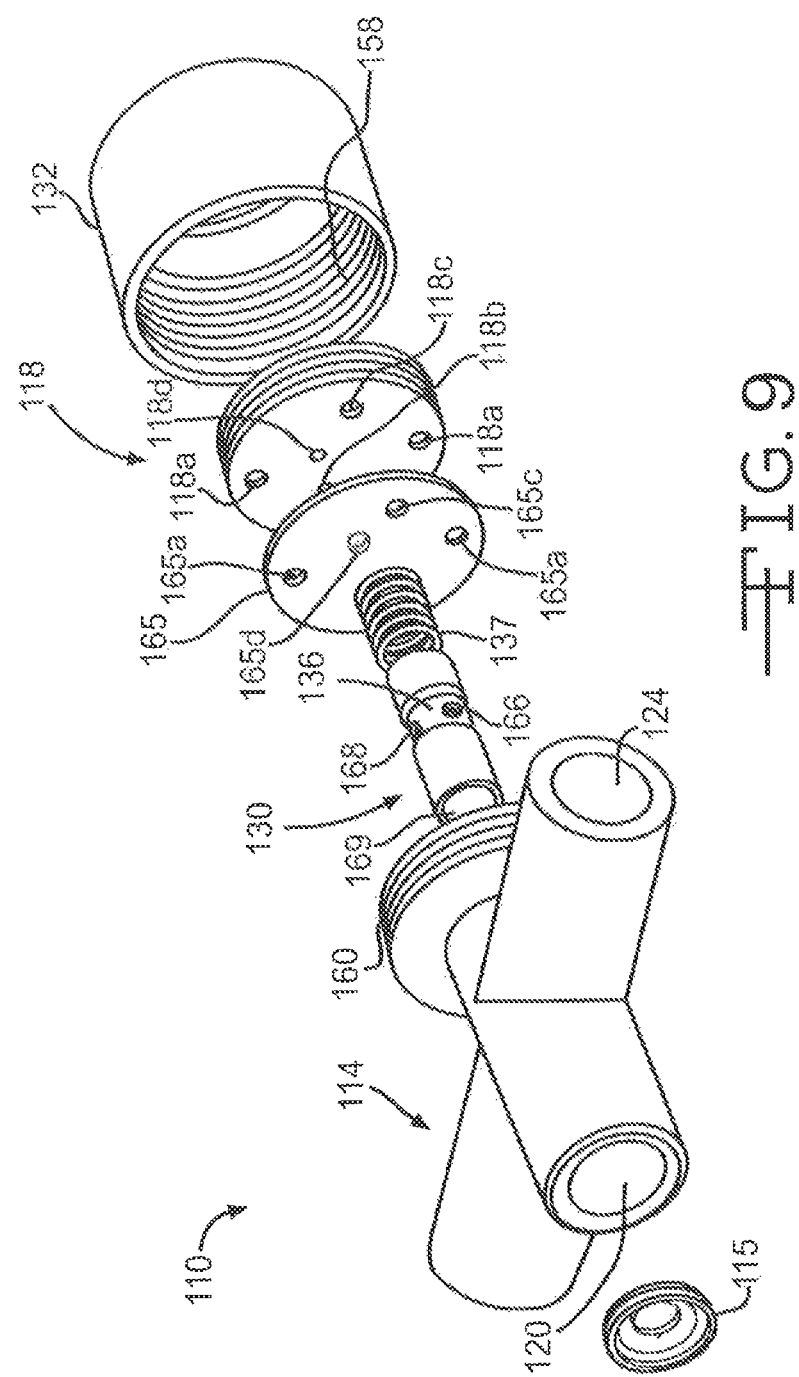
FIG. 9 is a view similar to FIG. 8, except shown from another perspective

In FIGS. 7 through 9, there is illustrated an alternate embodiment of a microvalve device operating as a pressure control valve, generally indicated at 110, comprising a pilot-operated main valve 112 having a main valve body 114, a pilot microvalve 116, and a manifold 118.

The manifold 118 may be a solid block of a single material which is drilled or otherwise formed to create suitable passages therein. As illustrated in FIG. 7, the manifold 118 may alternatively be formed of multiple components. For example, the manifold 118 may be formed with multiple plates of material, into which various grooves and holes are fashioned, so that when the plates are assembled and joined, the requisite passageways are defined by one or more of the plates. U.S. Pat. Nos. 6,505,811 and 6,581,640, the disclosures of which are incorporated by reference, provide examples of some of the fluid distributing substrates or manifolds which might be adapted for use as the manifold 118 (or indeed the manifold 18 above, or the manifold 218 discussed below) through appropriate modification in light of the specific structure of the associated microvalve and pilot-operated main valve. The manifold 118 may be provided with a plurality of through holes and through passageways to connect the various fluid conduits of the pilot microvalve 116 as will be described. In particular, the manifold 118 may include one or more alignment holes 118a, the purpose of which is discussed below. The manifold 118 may also include a passageway 118b which communicates with the inlet of the pilot microvalve 116, that is, with the inlet of a first microvalve fluid conduit (not seen) in which a pair of variable orifices (not seen) are arranged in series to generate a command pressure in the fluid therebetween. A passageway 118c in the manifold 118 communicates with the return outlet of the pilot microvalve 116, that is, with the outlet of the first microvalve fluid conduit. A second fluid conduit is connected to the first microvalve fluid conduit between the variable orifices. A passageway 118d in the manifold 118 forms part of this second fluid conduit, which second fluid conduit communicates with the pilot microvalve 116 to transmit command pressure from the pilot microvalve 116 to the main valve 112.

The main valve body 114 may have multiple ports, including for example a load port 120, a supply port 122 which may be connected to a fluid conduit containing fluid at a relatively high pressure, and a return port 124 which may be connected to a fluid conduit at a relatively low pressure, all in fluid communication with a longitudinal bore 126 in the main valve body 114. The supply port 122 may be in fluid communication with the longitudinal bore 126 via a supply passageway 122a. Similarly, the return port 124 may be in fluid communication with the longitudinal bore 126 via a return passageway 124a. Further, the load port 120 may be in fluid communication with the longitudinal bore 126 via a load passageway 120a. Note that, in the illustrated embodiment, the longitudinal bore 126 communicates directly with the load port 120, and so the longitudinal bore 126 is considered to form part of the load passageway 120a, as the longitudinal bore forms a fluid conduit connecting the load port to an axial end face of a spool 130 so as to transmit load pressure to the axial end face.

The main valve 112 may include the spool 130 supported for movement in relation to the longitudinal bore 126. The spool 130 may be captured in the longitudinal bore 126 at one end of the longitudinal bore 126 by the manifold 118, which may be held in fixed relation to the longitudinal bore 126 by a retaining element which may be in the form of a cap 132, and at the other end of the longitudinal bore 126 by a retainer or stop 115, which may be pressed into or otherwise suitably fixed in a position within the load port 120.

The cap 132 may have a female threaded portion 158 that threadably engages a male threaded portion 160 of the main valve body 114. It should be noted however, that the cap 132 may be fastened in any suitable manner, including welding, brazing, deformation, shrink fitting, etc. Indeed, the retaining element embodied as the cap 132 may be in the form other than a cap, as suitable for the intended installation, such as a retaining flange, a plug, a shoulder on a blind end of the longitudinal bore 126, or other suitable design. As best seen in FIGS. 8 and 9, the male threaded portion 160 of the main valve body 114 has a flat axial end face 114a with an opening into the longitudinal bore 126. One or more alignment pins 114b may be formed on the axial end face 114a to engage the alignment holes 118a of the manifold 118, to align the manifold 118 in proper orientation relative to a plurality passageways formed in the main valve body 114. One such passageway is a first passageway 114c, shown in FIGS. 7 and 8, which provides fluid communication between the supply passageway 122a and the pilot microvalve 116, to supply pressurized fluid to the pilot microvalve 116. A second passageway 114d (seen in FIG. 7) which provides fluid communication between the return passageway 124a and the pilot microvalve 116, to provide a return path for the fluid from the pilot microvalve 116.

A gasket 165 may be interposed between the manifold 118 and the main valve body 114 to assist in sealing the fluid connections between the manifold 118 and the axial end face 114a of the male threaded portion 160 of the main valve body 114. As best seen in FIGS. 8 and 9, the gasket 165 may be provided with holes therethrough, including holes 165a to accommodate the one or more alignment pins 114b. A hole 165b provides a pressure boundary coupling the passageway 114c that communicates with the supply passage 122a of the main valve 112 to the passageway 118b in the manifold 118, which communicates with the inlet of the pilot microvalve 116. Thus both the main valve 112 and the pilot microvalve 116 may be supplied with fluid at the pressure of the supply port 122. A hole 165c provides a pressure boundary coupling the passageway 114d in the main valve body 114 communicating with the return passageway 124a to the passageway 118c in the manifold 118, which communicates with the return outlet of the pilot microvalve 116. Thus the main valve 112 and the pilot microvalve 116 may be connected to a common return path via the return port 124. Furthermore, there may be a generally centrally located hole 165d to provide fluid communication from the opening 118d in the manifold 118 forms part of the second fluid conduit that communicates with the pilot microvalve 116 to transmit command pressure from the pilot microvalve 116 to the main valve 112. The hole 165d may be sized to provide a desired amount of damping to changes in command pressure transmitted therethrough.

The spool 130 may have an annular valve groove 136 formed on an outer surface thereof that may be in fluid communication with one or more bores or passages 166, 168 in the spool 130, which in turn may be in fluid communication with a longitudinal bore 169 in the spool 130. The spool 130 may be supported for movement in the longitudinal bore 126 so that the annular valve groove 136 in the spool 130 is in fluid communication selectively with either an annular groove 134 in the longitudinal bore 126 or an annular groove 135 in the longitudinal bore 126. The groove 134 in the longitudinal bore 126 may be in fluid communication with the supply port 122, while the other annular groove 135 in the longitudinal bore 126 may be in fluid communication with the return port 122. In this way, the spool 130 of the main valve 112 may be movable to control fluid flow between the load port 120 and the supply port 122, or the load port 120 and the return port 124.

In the illustrated embodiment, a spring 137 urges the spool 130 toward a normal position in which the spool 130 may be disposed in the absence of any other significant forces acting on the spool 130. The normal position of the spool 130 in the illustrated embodiment is one in which fluid communication exists between the load port 120 and the supply port 122 of the main valve body 114, and fluid communication is blocked between the load port 120 and the return port 124 (i.e., to the left when viewing FIG. 7). Hence, the illustrated embodiment, the main valve 112 is normally open between the load port 120 and the supply port 122, and normally closed between the load port 120 and the return port 124. It should be understood that the main valve 112 can be configured as normally closed between the load port 120 and the supply port 122 and normally open between the load port 120 and the return port 124 by positioning the spring 137 accordingly (i.e., to the left of the spool 130 when viewing FIG. 7), so that the spool 130 may be urged rightward (as viewed in FIG. 7) in the absence of any other significant forces acting on the spool 130. It should be recognized that the force exerted by the spring 137 will normally be relatively minor compared to the forces exerted by the fluid pressures acting on the spool 130 during operation (and in any event, the effect of a spring preload in the balance of forces acting on a spool valve is easily comprehended by those of ordinary skill in the art of design of such spool valves). Therefore, for the sake of simplicity, a description of the minor effects of the spring 137 on the operation of the main valve 112 will be omitted from the description of operation of the pressure control valve 110.

A command chamber 172 may be provided at the end of the longitudinal bore 126 opposite the load port 120. A command pressure $P_2$ in the command chamber 172 controls the movement of the spool 130. The fluid in the command chamber 172 exerts a force on one end of the spool 130, while the fluid in the longitudinal bore 126, which is at load pressure, exerts an opposing force on the opposite end of the spool 130. Any imbalance in these forces may result in the spool 130 moving in response. Applying a command pressure $P_2$ above the load pressure may move the spool 130 so that the annular valve groove 136 in the spool 130 may be in fluid communication with the annular groove 134 to permit fluid flow between the load port 120, which is at a relatively high pressure, and the supply port 122, raising pressure at the load port 120. Applying a command pressure $P_2$ below the load pressure may move the spool 130 so that the annular valve groove 136 in the spool 130 may be in fluid communication with the annular groove 135 to permit fluid flow between the load port 120 and the return port 124, which is at a relatively low pressure, lowering pressure at the load port 120.

The command pressure $P_2$ in the command chamber 172 may be controlled by the pilot microvalve 116 which may be in fluid communication with the command chamber 172 via the manifold 118, and which may be in fluid communication with the supply port 122 and the return port 124 via passages in the manifold 18 to control the command pressure $P_2$. Thus the supply pressure to the pilot microvalve 116 may be the same as the supply pressure to the main valve 112, and both the pilot microvalve 116 and the main valve 112 may have the same return pressures.

The pilot microvalve 116 may include a movable valve element that has two orifices in series (not shown), like that described above with reference to the pilot microvalve 16 and schematically represented in FIG. 6. During operation of the pilot microvalve 116, the area of the upstream variable orifice and the area of the downstream variable orifice may be changed, so that the variable command pressure $P_2$ may be created in the fluid between the orifices. The command pressure $P_2$ thus developed may be may be any desired fraction of the supply pressure $P_1$.

The microvalve device in the form of the pressure control valve 110 operates as discussed below, and with reference again to FIG. 11, according to the following method:

In a first step 81, a fluid is supplied at a supply pressure P1 to the pilot microvalve 116, and, more specifically, to the upstream one of the series variable orifices of the pilot microvalve 116.

In a second step 82, a control signal (which may be, depending upon the particular design of the pilot microvalve 116, an electrical signal, a pneumatic signal, a fluid pressure signal, a sensible heat signal, or any other suitable signal for which a microvalve may be designed to react) is supplied to the pilot microvalve 116 to set the cross sectional areas $A_1$ and $A_2$ of the series variable orifices of the pilot microvalve 116.

In a third step 82, the command pressure $P_2$ is supplied from the microvalve 116 to the command chamber 172 of the main valve 112 as a function of pressure $P_1$ supplied to pilot microvalve 116, and the cross sectional areas of the series variable orifices, according to Equation 4 above. The pressure in the command chamber 172 may be somewhat damped in a manner similar to the first embodiment of a microvalve device in the form of the pressure control valve 10, discussed above.

Next, in a step 83, the main valve 112 is repositioned by the command pressure in the command chamber 172, so that pressure supplied to the load port 120 of the main valve body 114 follows the command pressure supplied from the microvalve 116. Applying a command pressure above the load pressure may move the spool 130 so that the load port 120 may be in fluid communication the supply port 122 to increase the load pressure. If the pressure in the command chamber 172 is below the load pressure, the spool 130 may move so that the load port 120 is in fluid communication with the return port 124 to lower the load pressure. When the load pressure is equal to the pressure in the command chamber 172, the spool 130 may be moved to a modulating position where the load port 120 is not in fluid communication with either the supply port 122 or the return port 124. In this way, the pressure supplied by the main valve 112 to the load follows command pressure supplied by the pilot microvalve 11, and the microvalve device that is the pressure regulating valve 110 is responsive to the command signal supplied to the pilot microvalve 116.

Figure 10:
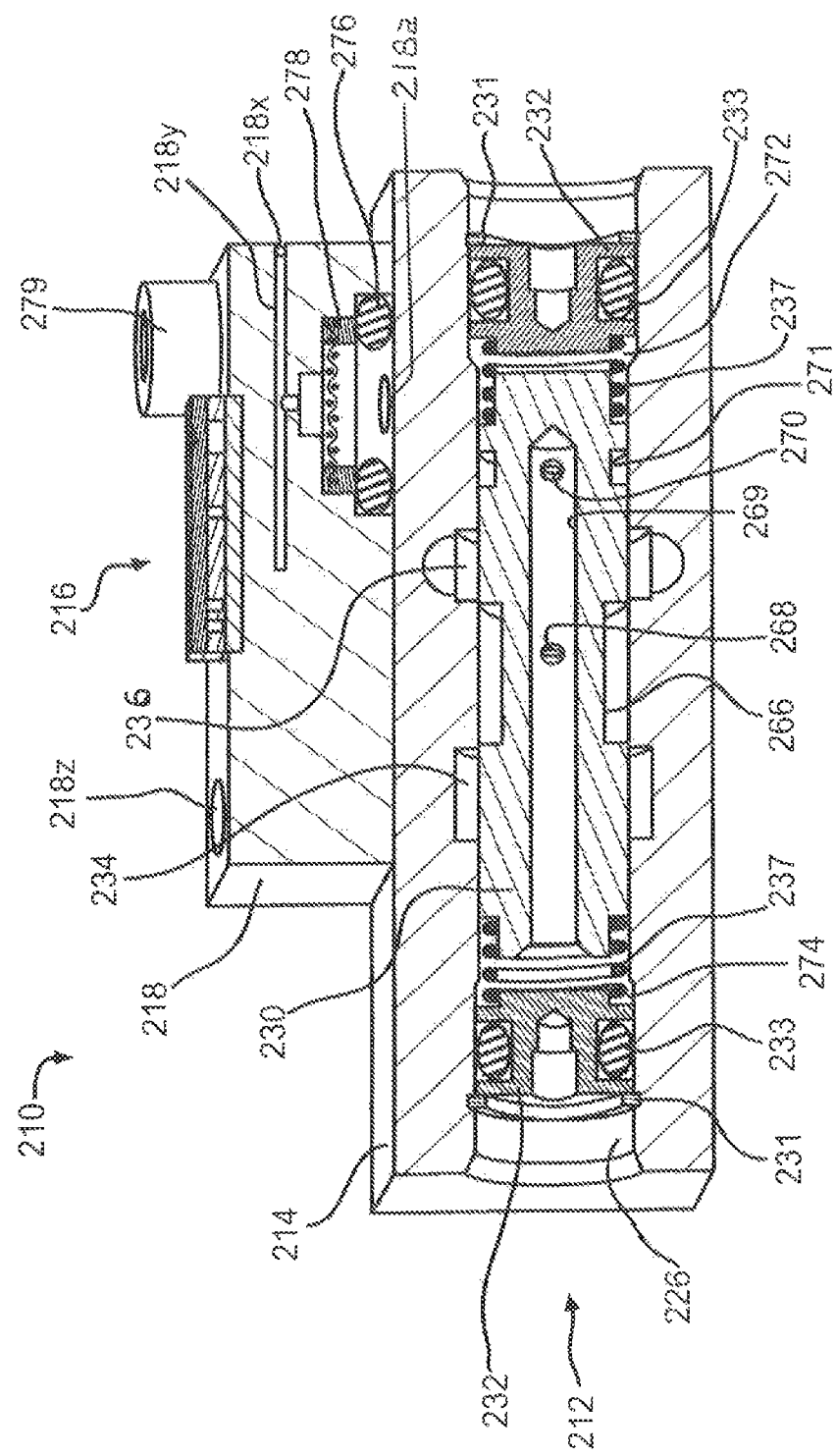
FIG. 10 is a perspective view, partly in section, of an alternate embodiment of a pressure control valve embodied as a microvalve device.

In FIG. 10, there is illustrated an alternate embodiment of a microvalve device operating as a pressure control valve, generally indicated at 210, comprising a pilot-operated main valve 212 having a main valve body 214 and a spool 230. The microvalve device 210 may further include a pilot microvalve 216, and a manifold 218.

The main valve body 214 may have multiple ports, including for example a load port (not shown) which may be connected with a load to which fluid is to be supplied at a controlled pressure by the pressure control valve 210. The main valve body 214 may further have a supply port (not shown) which may be connected to a fluid conduit containing fluid at a relatively high pressure, and a return port (not shown) which may be connected to a fluid conduit at a relatively low pressure. The load port, the supply port, and the return port may all be in fluid communication with a longitudinal bore 226 defined in the main valve body 214.

The longitudinal bore 226, as illustrated in FIG. 10, may be formed as a through bore through the main valve body 214. Two axially spaced annual grooves 234 and 236 may be formed in a generally axially central portion of the longitudinal bore 226. The groove 234 is to the left of the groove 236 as viewed in FIG. 10, and may be connected in constant fluid communication with the supply port. The groove 236 may be connected in constant fluid communication with the return port. Adjacent each open end of the longitudinal bore 226, annular grooves may be formed on the surface defining the longitudinal bore for receiving respective circlips or internal snap rings 231.

Each of the snap rings 231 may act to retain a respective plug 232. The plugs 232 may act to seal respective ends of the longitudinal bore 226. Each of the plugs 232 may define a respective circumferentially extending annular groove in a respective outer surface thereof, which circumferentially extending annular grooves receive respective seals or o-rings 233 to seal between the respective plug 232 and the surface defining the longitudinal bore 226.

The spool 230 may have a first end (the right-hand end as viewed in FIG. 10) with an axial end face. The spool 230 also has a second end opposite the first end (the left-hand end as viewed in FIG. 10) which also may have an axial end face. A command chamber 272 may be defined between the axial end face of the first end of the spool 230 and the adjacent plug 232. A load chamber 274 may be defined between the axial end face of the second end of the spool 230 and the adjacent plug 232.

The spool 230 may supported for movement in relation to the longitudinal bore 226. The spool 230 may be captured in the longitudinal bore 226 by the plugs 232 at each end of the longitudinal bore 226. The spool 230 may have an annular valve groove 266 formed on an outer surface thereof. The spool 230 may further cooperate with the body 214 to define a pressure space in the form of a second annular groove 271 formed in the outer surface of the spool 230. A bore 269 may be formed in the spool 230, which bore 269 may be in fluid communication with the load chamber 274. A bore 268 may be formed in the spool 230 which provides fluid communication between the annular valve groove 266 and the longitudinal bore 269. A bore 270 may be formed in the spool 230 which provides fluid communication between the second annular groove 271 and the longitudinal bore 269.

The spool 230 may be supported for movement in the longitudinal bore 226 so that the annular valve groove 266 in the spool 230 may be, in a first position, in fluid communication selectively with the annular groove 234, and thus in fluid communication with the supply port. In a second position of the spool 230 in the longitudinal bore 226, the annular valve groove 266 may be in fluid communication with the annular groove 236, and thereby in fluid communication with the return port. In this way, the spool 230 of the main valve 212 may be movable to control fluid flow between the load port and the supply port, or the load port and the return port.

In the illustrated embodiment, a pair of springs 237 urges the spool 230 toward a normal position in which the spool 230 may be disposed in the absence of any other significant forces acting on the spool 230. The normal position in the illustrated embodiment is a closed center condition. However, the microvalve device 210 could alternatively be designed with slightly changed dimensions to have an open center condition. In the closed center condition, the annular valve groove 266 is not in communication with either the annular groove 234 or the annular groove 236, and therefore the load port and the load chamber 274 are isolated from both the supply port and the return port. However, in an open center condition (not shown), the annular valve groove 266 would have an overlap with and be in communication with both the annular groove 234 and the annular groove 236, and therefore the load port and the load chamber 274 would be in simultaneous fluid communication with both the supply port and the return port. It will be recognized that the main valves 12 and 112 described above may also be designed with an open center condition rather than the closed center condition illustrated and described above.

It should be recognized that the force exerted by the springs 237 will normally be relatively minor compared to the forces exerted by the fluid pressures acting on the spool 230 during operation (and in any event, the effect of a spring preload in the balance of forces acting on a spool valve is easily comprehended by those of ordinary skill in the art of design of such spool valves). Therefore, for the sake of simplicity, a description of the minor effects of the springs 237 on the operation of the main valve 212 will be omitted from the description of operation of the pressure control valve 210. Indeed, in some designs, the springs 237 may be omitted.

A command pressure in the command chamber 272 controls the movement of the spool 230. The fluid in the command chamber 272 exerts a force on one end of the spool 230, while the fluid in the load chamber 274, which is at load pressure, exerts an opposing force on the opposite end of the spool 230. Any imbalance in these forces may result in the spool 230 moving in response. Applying a command pressure above the load pressure may move the spool 230 so that the annular valve groove 266 in the spool 230 may be in fluid communication with the annular groove 234 to permit fluid flow between the load port, which is at a relatively high pressure, and the supply port, raising pressure at the load port. Applying a command pressure below the load pressure may move the spool 230 so that the annular valve groove 266 in the spool 230 may be in fluid communication with the annular groove 236 to permit fluid flow between the load port and the return port, which is at a relatively low pressure, lowering pressure at the load port.

The command pressure in the command chamber 272 may be controlled by the pilot microvalve 216 which may be in fluid communication with the command chamber 272 via the manifold 218 (as will be described below), and which may be in fluid communication with the supply port and the return port via passages in the manifold 28 to control the command pressure (as will also be described below). Thus the supply pressure to the pilot microvalve 216 may be the same as the supply pressure to the main valve 212, and both the pilot microvalve 216 and the main valve 212 may have the same return pressures.

The pilot microvalve 216 may include a movable valve element that has two orifices in series in a first microvalve fluid conduit (not shown), like that described above with reference to the pilot microvalve 26 and schematically represented in FIG. 6. During operation of the pilot microvalve 216, the area of the upstream variable orifice and the area of the downstream variable orifice may be changed, so that a variable command pressure $P_2$ may be created in the fluid between the orifices. The command pressure $P_2$ thus developed may be may be any desired fraction of the supply pressure $P_1$. The command pressure $P_2$ may be communicated by a second fluid conduit providing fluid communication the region of the first fluid conduit between the series orifices of the first fluid conduit and the command chamber 272.

The manifold 218 may be a solid block of a single material which is drilled or otherwise formed to create suitable passages therein. While the manifold 218 could be formed with multiple plates of material like the manifold 118 illustrated in FIG. 7, in the embodiment illustrated in FIG. 10 the manifold 218 may be formed of a single block of material. In particular, the manifold 218 may include one or more attachment holes 218a, the purpose of which is discussed below. The manifold 218 may also include a plurality of passageways 218y which are formed in the material of the manifold in any suitable manner (including drilling, laser drilling, etching, etc.) to interconnect the pilot microvalve 216 and the pilot-operated valve 212 (as could be the manifolds 18 and 118 described above. Where necessary, portions the passageways 218y may be plugged in any suitable manner, such as by press fitting balls 218x into openings of the passageways 218y to the exterior surface of the manifold 218 to contain and direct fluid in the manifold 218 along the desired portions of the passageways 218y in the manifold 218.

The manifold 218 thus may include a passageway 218y which communicates with the inlet of the pilot microvalve 216, that is, with the inlet of the first microvalve fluid conduit (described above) in which the pair of variable orifices (not seen) are arranged in series to generate a command pressure in the fluid therebetween. A second passageway 218y in the manifold 218 may communicate with the return outlet of the pilot microvalve 216, that is, with the outlet of the first microvalve fluid conduit. As described above, the second fluid conduit may be connected to the first microvalve fluid conduit between the variable orifices. A third passageway 218y (which is partially seen in FIG. 10) in the manifold 218 forms part of this second fluid conduit, which fluid conduit communicates with the pilot microvalve 216 to transmit command pressure from the pilot microvalve 216 to the main valve 212. As illustrated in FIG. 10, a portion of the third passageway 218y may be formed by a stepped bore adjacent the main valve body 214.

In a larger diameter portion of the stepped bore of the third passageway 218y, a seal such as an o-ring 276 is disposed. The o-ring 276 is compressed between the manifold 218 and the main valve body 214 to form a fluid-tight seal and pressure boundary for the second fluid conduit containing fluid transmitting the command pressure to the pilot-operated main valve 212. Alternatively, the main valve body 214 may be provided with a recess in which the o-ring 276 is seated, and the manifold 218 may not have the larger diameter portion of the stepped bore of the third passageway 218y. Many other alternatives exist, such as foregoing individual seals or o-rings 276 altogether and utilizing a gasket (not shown) with appropriately positioned openings therethrough to connect corresponding passageways in the main valve body 214 with passageways 218y in the manifold 218.

In a smaller diameter portion of the stepped bore of the third passageway 218y a filter 278 may be seated. Similar filters may be disposed in the first and second passageways 218y. The filter 278 and the similar filters which may be disposed in the first and second passageways 218y filter the fluid passing therethrough.

The manifold 218 may be held in fixed relation to the body 214 of the main valve 212 by a retaining element which may be of any suitable structure, such as a weldment, brazed material, or a threaded fastener such as a cap screw 279 (only one illustrated). The cap screws 279 may extend through holes 218z formed through the manifold 218 to engage corresponding threaded holes (not shown) formed in the body 214 of the main valve 212. Suitably, the holes 218z and the corresponding threaded holes formed in the body 214 of the main valve 212 may be arranged in a pattern such that the manifold 218 can only be fixed to the body 214 in one orientation, thus helping to assure that the manifold 218 is assembled to the body 214 with each of the passageways 218y properly aligned with the corresponding passageways in the body 214.

The microvalve device in the form of the pressure control valve 210 may be operated as discussed below, and with reference again to FIG. 11, according to the following method: It should be noted that although this is a preferred embodiment of a method of operating the microvalve device, it is contemplated that other methods of operating exist that may be suitable in certain situations.

In a first step 81, a fluid is supplied at a supply pressure $P_1$ to the pilot microvalve 216, and, more specifically, to the upstream one of the series variable orifices of the pilot microvalve 216.

In a second step 82, a control signal (which may be, depending upon the particular design of the pilot microvalve 216, an electrical signal, a pneumatic signal, a fluid pressure signal, a sensible heat signal, or any other suitable signal for which a microvalve may be designed to react) is supplied to the pilot microvalve 216 to set the cross sectional areas $A_1$ and $A_2$ of the series variable orifices of the pilot microvalve 216.

In a third step 82, the command pressure $P_2$ is supplied from the microvalve 216 to the command chamber 272 of the main valve 212 as a function of pressure $P_1$ supplied to pilot microvalve 216, and the cross sectional areas of the series variable orifices, according to Equation 4 above. The pressure in the command chamber 272 may be somewhat damped in a manner similar to the first embodiment of a microvalve device in the form of the pressure control valve 20, discussed above.

Next, in a step 83, the main valve 212 is repositioned by the command pressure $P_2$ in the command chamber 272, so that pressure supplied to the load port of the main valve body 214 follows the command pressure $P_2$ supplied from the microvalve 216. Applying a command pressure $P_2$ above the load pressure may move the spool 230 so that the load port may be in fluid communication the supply port 230 to increase the load pressure. If the command pressure $P_2$ in the command chamber 272 is below the load pressure, the spool 230 may move so that the load port is in fluid communication with the return port to lower the load pressure. When the load pressure is equal to the command pressure $P_2$ in the command chamber 272, the spool 230 may be moved to the normal modulating position where the load port is not in fluid communication with either the supply port or the return port. In this way, the pressure supplied by the main valve 212 to the load follows command pressure $P_2$ supplied by the pilot microvalve 216, and the microvalve device that is the pressure regulating valve 210 is responsive to the command signal supplied to the pilot microvalve 216.

It should be noted that in a preferred embodiment the annular groove 271 is axially disposed not further from the command chamber 272 in any of the first, second, and normal positions, or positions therebetween, than the one of the supply port and the return port that is the closest axially to the command chamber 272. For the purpose of this measurement, the position at which the supply port communicates with the longitudinal bore 226 shall be taken as the position of the supply port; in the illustrated embodiment, this position is the position of the annular groove 234 which communicates with the supply port. Similarly, for the purpose of this measurement, the position at which the return port communicates with the longitudinal bore 226 shall be taken as the position of the return port; in the illustrated embodiment, this position is the position of the annular groove 236 which communicates with the return port. Since, during operation of the microvalve device 210 as described above, the main valve 212 tends to return to the normal position due to the equalization of command pressure and load pressure, during steady state operation of the microvalve device 210, command pressure will equal load pressure. Thus, since the annular groove 271 is under load pressure (since it communicates with the load chamber 274, leakage from the command chamber 272 is minimized or eliminated, since the first pressure region which would be encountered by any such leakage would be the groove 271. Since the groove 271 is at the same pressure as the command chamber 272, there is no differential pressure to drive leakage from the command chamber 272, or indeed, to drive leakage from the groove 271 into the command chamber. Accordingly, the pilot microvalve 216 may not have to accommodate leakage flow from or into the command chamber 272, and can therefore more easily accurately control operation of the pilot-operated main valve 212.

It will be appreciated that the spools 30 and 130 may be provided with a pressure space in the form of a groove similar to the groove 271, that is, a groove which is supplied with fluid at the pressure of the load port, and which is located axially closer to respective the command chamber 72, 172 than either the respective supply port (considered to have, respectively, the axial position of the bore 34a in the case of the spool 30, or the groove 134 in the case of the spool 130) or return port (considered to have, respectively, the axial position of the bore 35a in the case of the spool 30, or the groove 135 in the case of the spool 130).

Alternatively, the main valves 12, 112, and 212 may be provided with a pressure space in the form of a groove (formed in the respective body 14, 114, 214, which extends circumferentially about the respective spool 30, 130, 230. Such a groove in the respective body 14, 114, 214 may be supplied with fluid at the pressure of the load port via a passageway defined in the respective body 14, 114, 214 or in the respective spool 30, 130, 230. Additionally, such a groove in the respective body 14, 114, 214 may be located axially closer to respective the respective command chamber 72, 172, 272 than either the respective supply port (considered to have, respectively, the axial position of the bore 34a in the case of the spool 30, the groove 134 in the case of the spool 130, or the groove 234 in the case of the microvalve device 210) or return port (considered to have, respectively, the axial position of the bore 35a in the case of the spool 30, the groove 135 in the case of the spool 130, or the groove 236 in the case of the microvalve device 210) wherever the respective spool 30, 130, 230 is moved between the first, second, and third positions thereof.

Figure 12:
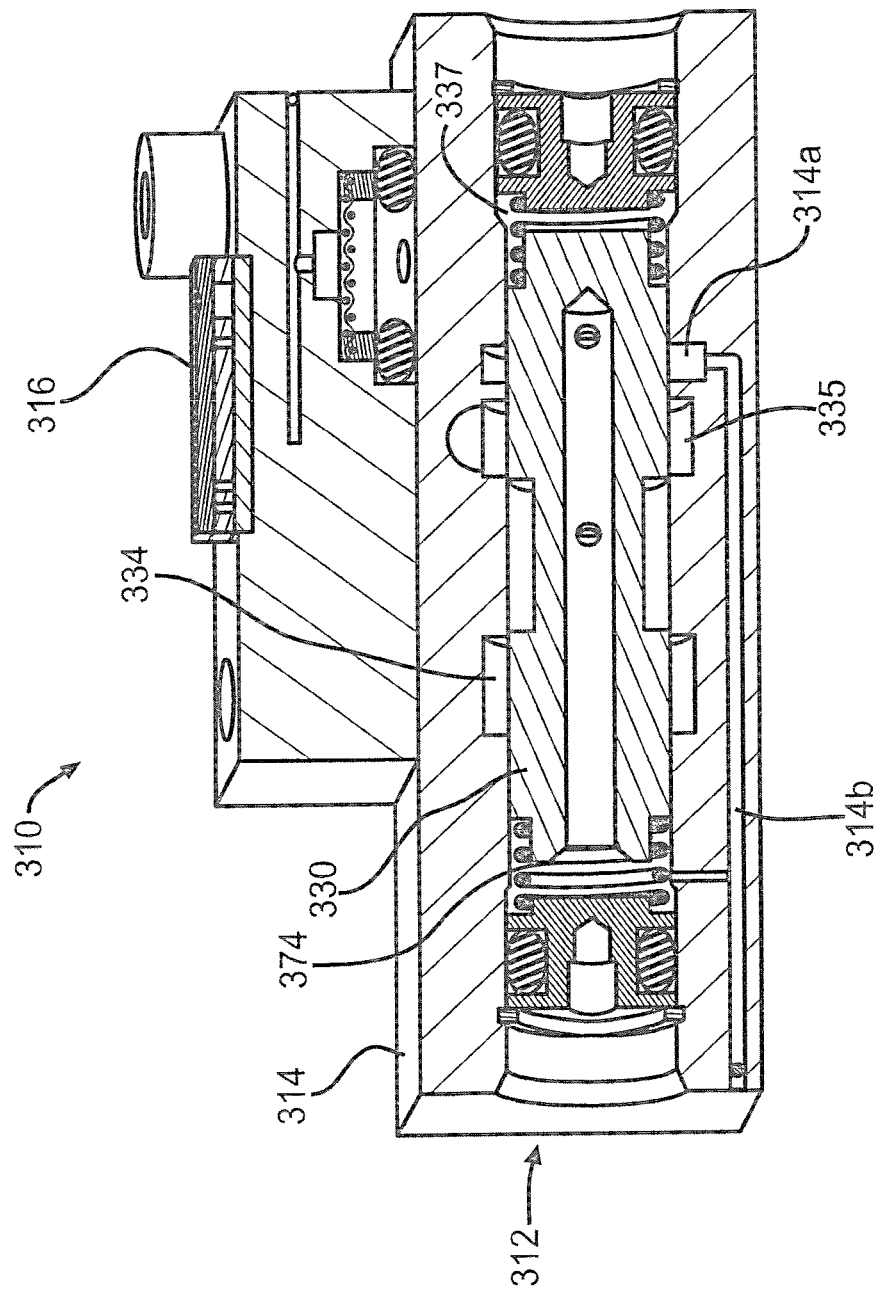
FIG. 12 is an alternate embodiment of a pressure control valve embodied as a microvalve device.

Such an arrangement with a pressure space formed in the main valve body is illustrated in FIG. 12, which is an alternate embodiment of the valve shown in FIG. 10. In FIG. 12 there is illustrated an alternate embodiment of a microvalve device operating as a pressure control valve, generally indicated at 310, comprising a pilot-operated main valve 312 having a main valve body 314 and a spool 330. The microvalve device 310 may further include a pilot microvalve 316.

As will be appreciated by inspection of FIG. 12, the microvalve device 310 is generally similar in structure and operation to the microvalve device 210, except that the spool 330 omits the groove 271 and the bore 269 of the spool 230. Additionally, a groove 314a is formed in the inner surface of the longitudinal bore formed in the main valve body 314. A passageway 314b is formed in the main valve body 314 which interconnects groove 314a with a load chamber 374 that is in fluid communication with the load port of the pilot-operated main valve 312. The main valve body 314 and the spool 230 thus cooperate to define a pressure space in the groove 314a which is subjected to load pressure. The pressure space in the groove 314 will always be closer to a command chamber 337 of the main valve 312 than either the groove 334 connected to the supply port (not shown) or the groove 335 connected to the return port (not shown)

Although the above embodiments illustrate cases in which a return port of the main valve is connected to the respective longitudinal bore closer to the respective command chamber than the associated supply port, such need not be the case. For example, in FIG. 13, there is illustrated an alternate embodiment of a microvalve device operating as a pressure control valve, generally indicated at 410, comprising a pilot-operated main valve 412 having a main valve body 414 and a spool 430. The microvalve device 410 may further include a pilot microvalve 416.

Figure 13:
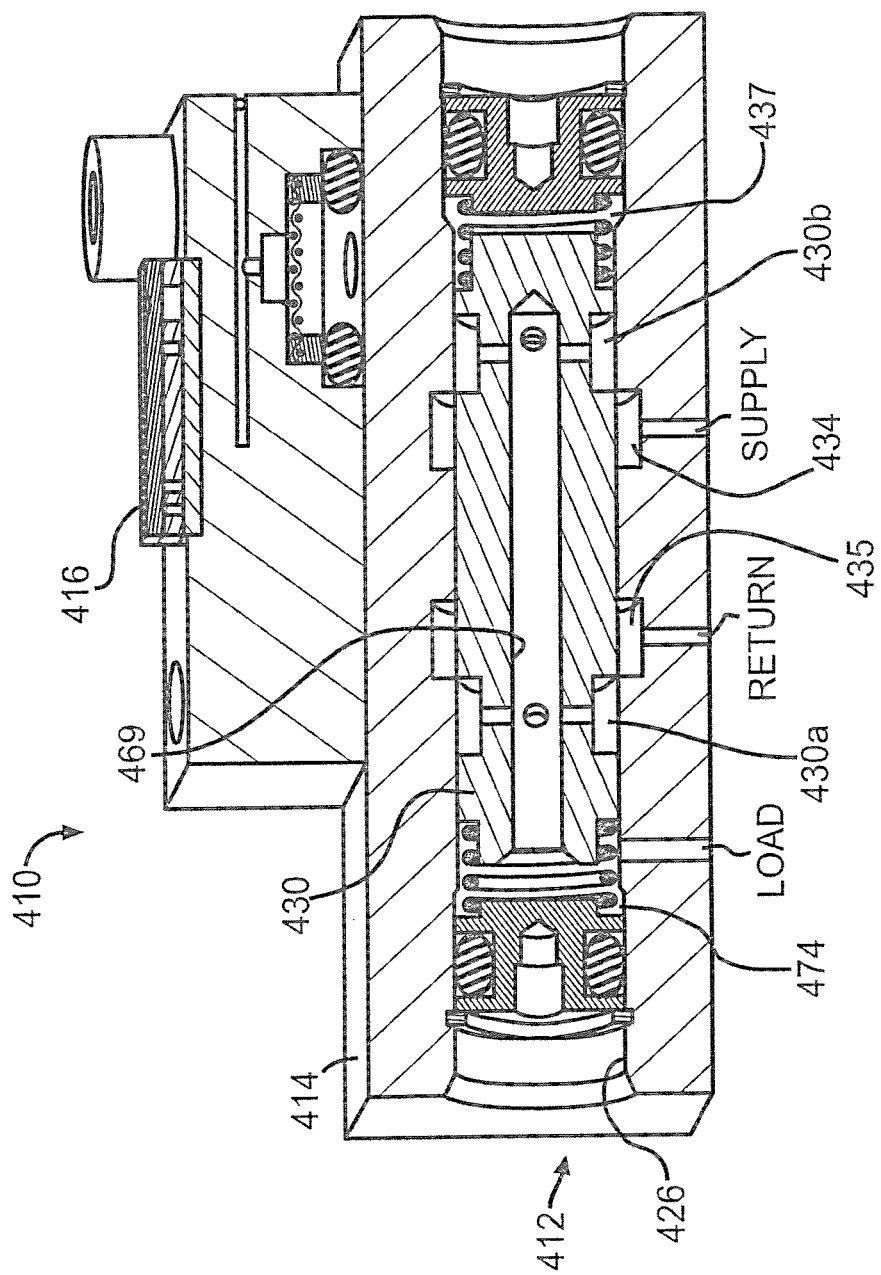
FIG. 13 is an alternate embodiment of a pressure control valve embodied as a microvalve device.

As will be appreciated by inspection of FIG. 13, the microvalve device 410 is generally similar in structure and operation to the microvalve device 210. For example, similar to the spool 230, the spool 430 has two axially spaced apart grooves 430a and 430b defined in the exterior surface thereof. Each of the grooves 430a and 430b communicates with a longitudinal bore 469 in the spool 430, and, therethrough is in fluid communication with a load chamber 474 defined at one end of the spool 430. A command chamber 437 is defined adjacent the opposite end of the spool 430.

However, in the microvalve device 410, when the spool 430 is in the illustrated third, modulating position, and not in communication with either a groove 434 connected to the supply port or a groove 435 connected to the return port, the groove 434 and the groove 435 are both axially disposed between the grooves 430a and the groove 430b. The spool 430 can be moved leftward (as viewed in FIG. 13) to a first position in which the grooves 430b and the groove 434 are in fluid communication, thus supplying fluid from the supply port to the load port via the grooves 434 and 430b to the longitudinal bore 469 in the spool 430, into the load chamber 474 and to the load port, resulting in an increase in load pressure. The spool 430 can similarly be moved rightward (as viewed in FIG. 13, to a second position in which the grooves 430a and the groove 435 are in fluid communication, lowering load pressure by relieving pressure from the load chamber 474, through the longitudinal bore 469, to the return port via the groove 430a and 435.

Note that the supply port of the main valve 412 is connected to the longitudinal bore 469 (via the groove 434) axially closer to the command chamber 437 than is the return port (via the groove 435). Also note that the pressure space created in the groove 430b and defined by the spool 430 and the body 412 is at load pressure, and will always be no further away from the command chamber 437 than is the groove 434 connected to the supply, and, of course, always closer to the command chamber 437 than the groove 435 connected to the return port, since the groove 435 is axially further away from the command chamber 437 than the groove 434. Therefore leakage from the command chamber 437 is minimized since the next adjacent pressure space is at load pressure, which is normally the same as command pressure except during brief transients.

In summary, an aspect of this disclosure relates to a device that includes a pilot-operated valve operating in response to a command pressure to supply fluid at a load pressure to a load, which load pressure is substantially equal to command pressure during steady state flow conditions. A pilot microvalve generates the command pressure in a fluid conduit communicating with the pilot-operated valve such that the command pressure can be varied between 0% and 100% of a supply pressure, which supply pressure is the pressure of a pressurized fluid supplied to the pilot microvalve.

In further summary, an aspect of this disclosure relates to a method operating a microvalve device in the form of a pressure control valve having a pilot-operated main valve supplying pressure to a load port in a main valve body and a pilot microvalve with an first orifice having a first variable cross sectional area $A_1$ and a second orifice having a second variable cross sectional area $A_2$. The pilot microvalve develops a control pressure between the first orifice and the second orifice, which control pressure is supplied by the pilot microvalve to the main valve for use in controlling the operation of the main valve. The method includes, as a first step, supplying a fluid at a pressure $P_1$ to the upstream one of the first orifice $A_1$ and the second orifice $A_2$ of the pilot microvalve. A second step of the method includes supplying a control signal to the pilot microvalve to set the cross sectional areas $A_1$ of the first orifice and the cross sectional areas $A_2$ of the second orifice. A third step of the method includes supplying a command pressure $P_2$ from the microvalve to the main valve as a function of the pressure $P_1$ supplied to the pilot microvalve and the cross sectional areas $A_1$ and $A_2$ of the orifices according to the equation $$P_2 = \frac{P_1 \cdot A_1^2}{A_1^2 + A_2^2}$$

A fourth step of the method includes repositioning the main valve so that pressure supplied to the load port of the main valve body is a function of the command pressure $P_2$ supplied from the pilot microvalve.

In further summary, an aspect of this disclosure relates to a microvalve device which includes a pilot-operated valve and a pilot microvalve. The pilot-operated valve includes a body defining a longitudinal bore therein, the body further defining a supply port in fluid communication with the longitudinal bore at a first axial position, a load port in fluid communication with the longitudinal bore at a second axial position, and a return port in fluid communication with the longitudinal bore at a third axial position. The pilot-operated valve further includes a spool disposed for movement in said longitudinal bore in response to a command pressure. The spool has a first end having an axial end face and a second end having an axial end face. The axial end face of the first end of the spool is in fluid communication with a command chamber. The axial end face of the second end of the spool is in fluid communication with a load chamber. The spool cooperates with the body to define a pressure space at a location axially spaced from the first end. The pressure space may be a groove in an external surface of the spool or a groove in the body extending about the spool, for example. A load passageway provides fluid communication between the load chamber and the pressure space. The spool is movable to a first position in which the load port and the load chamber are in fluid communication with the supply port. The spool is also movable to a second position in which the load port and the load chamber are in fluid communication with the return port. The spool is also movable to a third position which is one of a closed center condition and an open center condition. If the third position is a closed center condition, then the load port and the load chamber are isolated from both the supply port and the return port. If, instead, the design of the pilot-operated valve is such that the third position is an open center condition, then the load port and the load chamber are in fluid communication with both the supply port and the return port in the third position. The pressure space is axially disposed not further from the command chamber in any of the first, second, and third positions than the one of the supply port and the return port that is the closest axially to the command chamber. The microvalve device further includes a pilot microvalve connected to the pilot-operated valve to supply the command pressure to the command chamber to control the movement of the spool in the longitudinal bore of the pilot-operated valve. In a preferred embodiment, the load passageway is defined through a portion of the spool to provide fluid communication between the load chamber and the pressure space. Alternatively, load pressure may be communicated to the pressure space via a passageway through the body.

It must be understood that the invention may be practiced otherwise than as specifically explained and illustrated without departing from its spirit or scope. It is contemplated that there may be many alternate embodiments, some examples of which have been disclosed herein.

What is claimed is:
1. A spool valve comprising:
a body defining:
a longitudinal bore;

a supply port in fluid communication with the longitudinal bore and adapted to contain fluid at a supply pressure; and
a load port in fluid communication with the longitudinal bore and adapted to contain fluid at a load pressure;
a spool disposed in the longitudinal bore and comprising:
a first groove defined in an outer surface of the spool through which fluid flows from the supply port to the load port when the spool is in a first position; and
a second groove defined in the outer surface of the spool between the first end of the spool and the first groove;
the spool and the body cooperating to define a command chamber at a first end of the spool, wherein the command chamber is adapted to receive fluid at a command pressure supplied to the body;
the spool being movable between the first position permitting fluid communication between the supply port and the load port and a second position preventing fluid communication between the supply port and the load port; and
a pressure space defined by the second groove, the pressure space supplied with pressurized fluid at load pressure and disposed such that leakage from the command chamber is minimized.

2. The spool valve of claim 1, wherein
the spool and the body cooperate to define a load chamber at a second end of the spool opposite the first, which load chamber is in continuous fluid communication with the load port, and
the spool defines a passageway therein that supplies the second groove with fluid at load pressure from the load chamber.

3. The spool valve of claim 1, wherein the spool valve is a three-way valve and further comprises:
a return port in fluid communication with the longitudinal bore;
the spool being movable between the first position permitting fluid communication between the supply port and the load port while preventing fluid communication between the load port and the return port, the second position preventing fluid communication between the load port and either the supply port and the load port, and further being movable to a third position preventing fluid communication between the supply port and the load port while permitting fluid communication between the load port and the return port.

4. The spool valve of claim 3,
wherein the second groove being defined such that the second groove remains between the command chamber and the first groove when the spool is in the first position, the second position, and the third position.

5. The spool valve of claim 4, the spool further defining a fluid passageway in continuous fluid communication with the pressure space and the load port to supply the fluid at load pressure to the pressure space.

6. The spool valve of claim 4, the body further defining a fluid passageway in continuous fluid communication with the pressure space and the load port to supply the fluid at load pressure to the pressure space.

7. A spool valve comprising:
a body defining:
a longitudinal bore;
a supply port in fluid communication with the longitudinal bore and adapted to contain fluid at a supply pressure; and
a load port in fluid communication with the longitudinal bore and adapted to contain fluid at a load pressure;
a spool disposed in the longitudinal bore and comprising:
a first groove defined in an outer surface of the spool through which fluid flows from the supply port to the load port when the spool is in the first position; and
a second groove defined in the body extending circumferentially about the spool, and disposed such that in all positions of the spool, the second groove is disposed between the first end of the spool and the first groove, the second groove being supplied with fluid at load pressure to form the pressure space;
the spool and the body cooperating to define a command chamber at a first end of the spool, wherein the command chamber is adapted to receive fluid at a command pressure supplied to the body;
the spool being movable between a first position permitting fluid communication between the supply port and the load port and a second position preventing fluid communication between the supply port and the load port; and
a pressure space supplied with fluid at load pressure and disposed such that leakage from the command chamber is minimized.

8. A three-way spool valve comprising:
a body defining:
a longitudinal bore;
a supply port in fluid communication with the longitudinal bore and adapted to contain fluid at a supply pressure;
a load port in fluid communication with the longitudinal bore and adapted to contain fluid at a load pressure; and
a return port in fluid communication with the longitudinal bore;
a spool disposed in the longitudinal bore and comprising:
a first groove defined in the outer surface of the spool through which fluid flows from the supply port to the load port when the spool is in the first position; and
a second groove defined in one of an outer surface of the spool and an inner surface of the body defining the longitudinal bore;
the spool and the body cooperating to define a command chamber at a first end of the spool, wherein the command chamber is adapted to receive fluid at a command pressure supplied to the body;
the spool being movable between a first position permitting fluid communication between the supply port and the load port while preventing fluid communication between the load port and the return port, a second position preventing fluid communication between the load port and either the supply port and the load port, and further being movable to a third position preventing fluid communication between the supply port and the load port while permitting fluid communication between the load port and the return port;
the second groove being defined such that the second groove remains between the command chamber and the first groove when the spool is in the first position, the second position, and the third position; and
a pressure space defined by the second groove, the pressure space supplied with pressurized fluid at load pressure and disposed such that leakage from the command chamber is minimized.

\* \* \* \* \*